(12) United States Patent
Yang et al.

(10) Patent No.: US 11,700,365 B2
(45) Date of Patent: Jul. 11, 2023

(54) POSITION DETECTION METHOD, POSITION DETECTION DEVICE, AND DISPLAY DEVICE

(71) Applicant: SEIKO EPSON CORPORATION, Tokyo (JP)

(72) Inventors: Jun Yang, Markham (CA); Guoyi Fu, Richmond Hill (CA)

(73) Assignee: Seiko Epson Corporation, Tokyo (JP)

( * ) Notice: Subject to any disclaimer, the term of this patent is extended or adjusted under 35 U.S.C. 154(b) by 152 days.

(21) Appl. No.: 17/177,303

(22) Filed: Feb. 17, 2021

(65) Prior Publication Data

US 2021/0258551 A1    Aug. 19, 2021

(30) Foreign Application Priority Data

Feb. 17, 2020 (JP) ................................. 2020-024060

(51) Int. Cl.
*H04N 17/00* (2006.01)
*H04N 9/31* (2006.01)
(Continued)

(52) U.S. Cl.
CPC ......... *H04N 17/002* (2013.01); *G06F 3/0304* (2013.01); *G06T 7/174* (2017.01);
(Continued)

(58) Field of Classification Search
CPC ......... G06F 2203/04108; G06F 3/0304; G06F 3/0421; G06F 3/042; G06T 7/174;
(Continued)

(56) References Cited

U.S. PATENT DOCUMENTS

2001/0028341 A1    10/2001    Kitazawa
2010/0073578 A1    3/2010     Tan
(Continued)

FOREIGN PATENT DOCUMENTS

JP    2001-222375 A    8/2001
JP    2003-296026 A    10/2003
(Continued)

OTHER PUBLICATIONS

Li et al., "Algorithm of Fingertip Detection and its Improvement Based on Kinect," 2017 International Conference on Industrial Informatics—Computing Technology, Intelligent Technology, Industrial Information Integration—4 pages.
(Continued)

*Primary Examiner* — Christopher S Kelley
*Assistant Examiner* — Ana Picon-Feliciano
(74) *Attorney, Agent, or Firm* — Dority & Manning, P.A.

(57) ABSTRACT

Position detection methods and systems are disclosed herein. The position detection method of detecting a position in an operation surface pointed by a pointing element includes obtaining a first taken image with the first infrared camera, obtaining a second taken image with the second infrared camera, removing a noise component from the first and second images converting the first and second taken into converted images without the noise component, forming a difference image between the first converted taken image and the second converted taken image, extracting a candidate area in which a disparity amount between the first converted taken image and the second converted taken image is within a predetermined range, detecting a tip position of the pointing element from the candidate area, and determining a pointing position of the pointing element and whether or not the pointing element had contact with the operation surface based on the detecting.

3 Claims, 31 Drawing Sheets

(51) Int. Cl.
| | |
|---|---|
| G06F 3/03 | (2006.01) |
| G06T 7/174 | (2017.01) |
| G06T 7/194 | (2017.01) |
| H04N 23/80 | (2023.01) |
| G06V 30/142 | (2022.01) |
| G06V 30/19 | (2022.01) |
| G06V 30/32 | (2022.01) |
| G06V 10/82 | (2022.01) |
| G06V 10/44 | (2022.01) |
| G06V 10/50 | (2022.01) |

(52) U.S. Cl.
CPC .......... *G06T 7/194* (2017.01); *G06V 10/454* (2022.01); *G06V 10/507* (2022.01); *G06V 10/82* (2022.01); *G06V 30/1423* (2022.01); *G06V 30/19173* (2022.01); *G06V 30/32* (2022.01); *H04N 9/3194* (2013.01); *H04N 23/80* (2023.01)

(58) Field of Classification Search
CPC .......... G06T 7/194; G06T 2207/10012; G06T 2207/10048; G06T 2207/20081; G06T 2207/20084; G06T 2207/30196; G06T 7/593; G06T 7/73; G06V 10/454; G06V 10/507; G06V 10/82; G06V 30/1423; G06V 30/19173; G06V 30/32; H04N 17/002; H04N 5/2256; H04N 5/23229; H04N 5/2354; H04N 5/247; H04N 9/3194; H04N 23/56; H04N 23/74; H04N 23/80; H04N 23/90; G01B 11/002
USPC ....................................................... 348/744
See application file for complete search history.

(56) References Cited

U.S. PATENT DOCUMENTS

| | | | |
|---|---|---|---|
| 2013/0088461 A1* | 4/2013 | Shamaie | G06V 40/107 |
| | | | 345/175 |
| 2013/0265228 A1 | 10/2013 | Tamura | |
| 2014/0294233 A1 | 10/2014 | Osamura et al. | |
| 2017/0143294 A1* | 5/2017 | Tashiro | A61B 8/5269 |
| 2018/0275832 A1* | 9/2018 | Toyooka | G06F 3/04184 |

FOREIGN PATENT DOCUMENTS

| | | |
|---|---|---|
| JP | 2010-072977 A | 4/2010 |
| JP | 2012-048393 A | 3/2012 |
| JP | 2014-142684 A | 8/2014 |
| JP | 2014-153870 A | 8/2014 |
| JP | 2014-202540 A | 10/2014 |
| JP | 2016-014954 A | 1/2016 |
| JP | 2016-218893 A | 12/2016 |
| JP | 2017-219942 A | 12/2017 |

OTHER PUBLICATIONS

Raheja et al., "Fingertip Detection: A Fast Method with Natural Hand," International Journal of Embedded Systems and Computer Engineering, vol. 3, No. 2, Jul.-Dec. 2011—10 pages.

Wang et al., "Efficient Hand Segmentation and Fingertip Detection Using Color Features of Skin and Fingernail," IEICE Trans. Information & Systems, vol. E96-D, No. 8, Aug. 2013—4 pages.

Lee et al., "Region-based corner detection by radial projection," Journal of the Optical Society of Korea, vol. 15, No. 2, Jun. 2011—3 pages.

Dawod et al., "Fingertips tracking based on gradient vector," Int. J. Advance Soft Compu. Appl., vol. 7, No. 3. Nov. 2015—11 pages.

Criminisi et al., "Computing the plane to plane homography," A Plane Measuring Device, Jul. 1997 http://www.robots.ox.ac.uk/~vgg/presentations/bmyc97/criminispaper/node3.html—2 pages.

* cited by examiner

270

FIG. 30
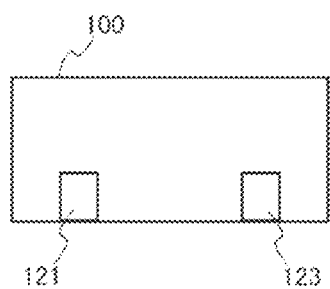
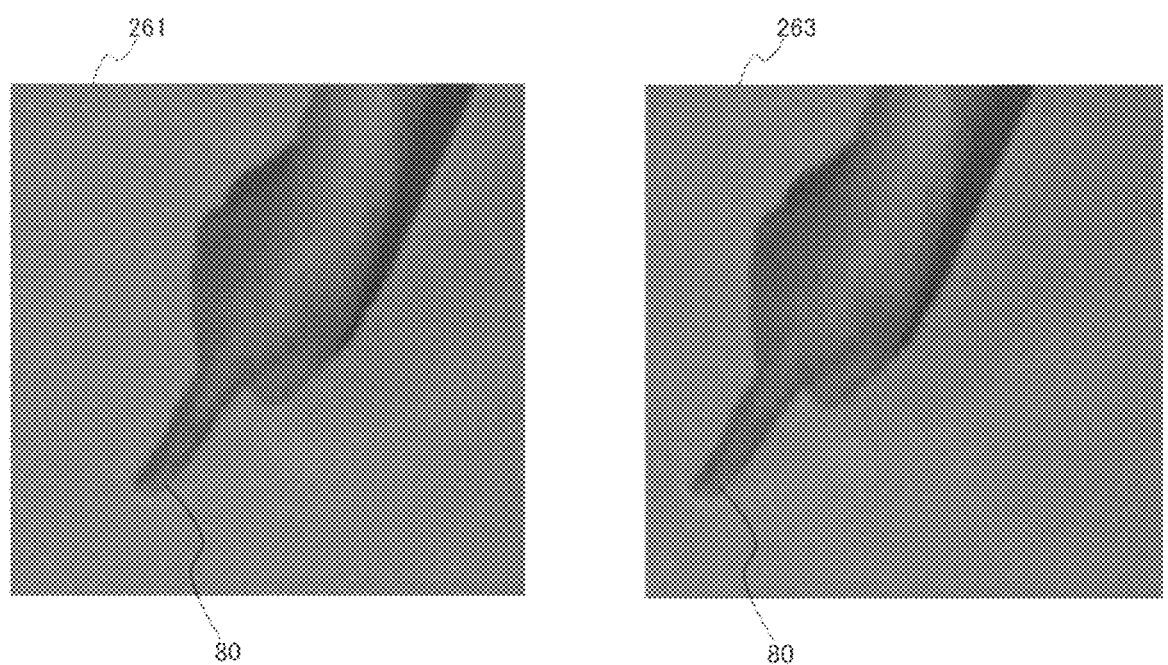

POSITION DETECTION METHOD, POSITION DETECTION DEVICE, AND DISPLAY DEVICE

The present application is based on, and claims priority from JP Application Serial Number 2020-024060, filed Feb. 17, 2020, the disclosure of which is hereby incorporated by reference herein in its entirety.

BACKGROUND

1. Technical Field

The present disclosure relates to a position detection method, a position detection device, and a display device.

2. Related Art

In the past, there has been known a device for detecting a position pointed by a user with a laser pointer or a finger (see, e.g., JP-A-2010-72977 (Document 1)). The device described in Document 1 is a device for projecting an image on a screen, and has a function of detecting a light spot generated on the screen with a laser pointer. This device outputs a position of the light spot using a projected image obtained by detecting an image projected on the screen with a light receiving section, and a background image obtained by detecting a background image projected on the screen with the light receiving section.

When the user points a position using a pointing element such as a finger or a rod, it is possible to accurately identify the pointing position intended by the user providing the position where the pointing element has contact with the operation surface can be detected. However, it is difficult to determine whether or not the pointing element has contact with the operation surface.

SUMMARY

An aspect of the present disclosure is directed to a position detection method of detecting a position in an operation surface pointed by a pointing element, the method including an irradiation step of performing irradiation with infrared light in a direction corresponding to the operation surface, an acquisition step of making a first imaging section and a second imaging section different in imaging viewpoint from each other and configured to take an image with the infrared light image the operation surface to obtain a first taken image and a second taken image calibrated with respect to the operation surface, a removal step of removing a noise component from the first taken image and the second taken image based on a degree of coincidence in luminance gradient between a background image obtained by imaging the operation surface with the first imaging section and the second imaging section when pointing by the pointing element is not performed and each of the first taken image and the second taken image, a formation step of forming a difference image between the first taken image and the second taken image with the noise component removed, an extraction step of extracting an area in which a disparity amount between the first taken image and the second taken image is within a predetermined range out of the difference image as a candidate area in which an image of the pointing element is included, a detection step of detecting a tip position of the pointing element from the candidate area extracted based on a shape of the pointing element, and a determination step of determining a pointing position of the pointing element in the operation surface and whether or not the pointing element had contact with the operation surface based on a detection result in the detection step.

The position detection method described above may be configured such that the determination step is a step of inputting a first area image clipped from the first taken image based on the tip position of the pointing element and a second area image clipped from the second taken image based on the tip position of the pointing element to a learned neural network to determine the pointing position of the pointing element in the operation surface and whether or not the pointing element had contact with the operation surface.

The position detection method described above may be configured such that in the extraction step, a variant value of pixel values of pixels constituting the difference image is calculated, and the difference image is separated into a background area and a foreground area as an area other than the background area based on the variant value calculated, and the candidate area is extracted based on a boundary between the background area and the foreground area separated, and an area of the difference image in which the disparity amount is within a predetermined range.

The position detection method described above may be configured such that, in the removal step, the noise component is removed from the first taken image and the second taken image based on a degree of coincidence in luminance gradient between the first taken image and a first part of the background image obtained by imaging the operation surface with the first imaging section when pointing by the pointing element is not performed, a degree of coincidence in luminance gradient between the second taken image and a second part of the background image obtained by imaging the operation surface with the second imaging section when pointing by the pointing element is not performed, and a degree of coincidence in luminance gradient between the first taken image and the second taken image.

Another aspect of the present disclosure is directed to a position detection device including an irradiation control section configured to perform irradiation with infrared light in a direction corresponding to an operation surface on which an operation with a pointing element is performed, an acquisition section configured to make a first imaging section and a second imaging section different in imaging viewpoint from each other and configured to take an image with the infrared light image the operation surface to obtain a first taken image and a second taken image calibrated with respect to the operation surface, a component removal processing section configured to remove a noise component from the first taken image and the second taken image based on a degree of coincidence in luminance gradient between a background image obtained by imaging the operation surface with the first imaging section and the second imaging section when pointing by the pointing element is not performed and each of the first taken image and the second taken image, a difference image formation section configured to form a difference image between the first taken image and the second taken image with the noise component removed, an extraction section configured to extract an area in which a disparity amount between the first taken image and the second taken image is within a predetermined range out of the difference image as a candidate area in which an image of the pointing element is included, a tip detection section configured to detect a tip position of the pointing element from the candidate area extracted based on a shape of the pointing element, and a determination section configured to determine a pointing position of the pointing element in the operation surface and whether or not the pointing element had contact with the operation surface based on a detection result in the tip detection section.

Another aspect of the present disclosure is directed to a display device including an irradiation section configured to perform irradiation with infrared light in a direction corresponding to an operation surface on which an operation with a pointing element is performed, a first imaging section configured to take an image with infrared light, a second imaging section different in imaging viewpoint from the first imaging section, and configured to take an image with the infrared light, an acquisition section configured to obtain a first taken image calibrated with respect to the operation surface from a taken image obtained by imaging the operation surface with the first imaging section, and obtain a second taken image calibrated with respect to the operation surface from a taken image obtained by imaging the operation surface with the second imaging section, a component removal processing section configured to remove a noise component from the first taken image and the second taken image based on a degree of coincidence in luminance gradient between a background image obtained by imaging the operation surface with the first imaging section and the second imaging section when pointing by the pointing element is not performed and each of the first taken image and the second taken image, a difference image formation section configured to form a difference image between the first taken image and the second taken image with the noise component removed, an extraction section configured to extract an area in which a disparity amount between the first taken image and the second taken image is within a predetermined range out of the difference image as a candidate area in which an image of the pointing element is included, a tip detection section configured to detect a tip position of the pointing element from the candidate area extracted based on a shape of the pointing element, a determination section configured to determine a pointing position of the pointing element in the operation surface and whether or not the pointing element had contact with the operation surface based on a detection result in the tip detection section, and a display section configured to display an image on a display surface set on the operation surface based on a pointing position of the pointing element having contact with the operation surface.

BRIEF DESCRIPTION OF THE DRAWINGS

FIG. 30 is a diagram showing a left clipped image and a right clipped image.

DESCRIPTION OF AN EXEMPLARY EMBODIMENT

Hereinafter, an embodiment of the present disclosure will be described with reference to the drawings.

A-1. Configuration of Interactive Projection System

Figure 1:
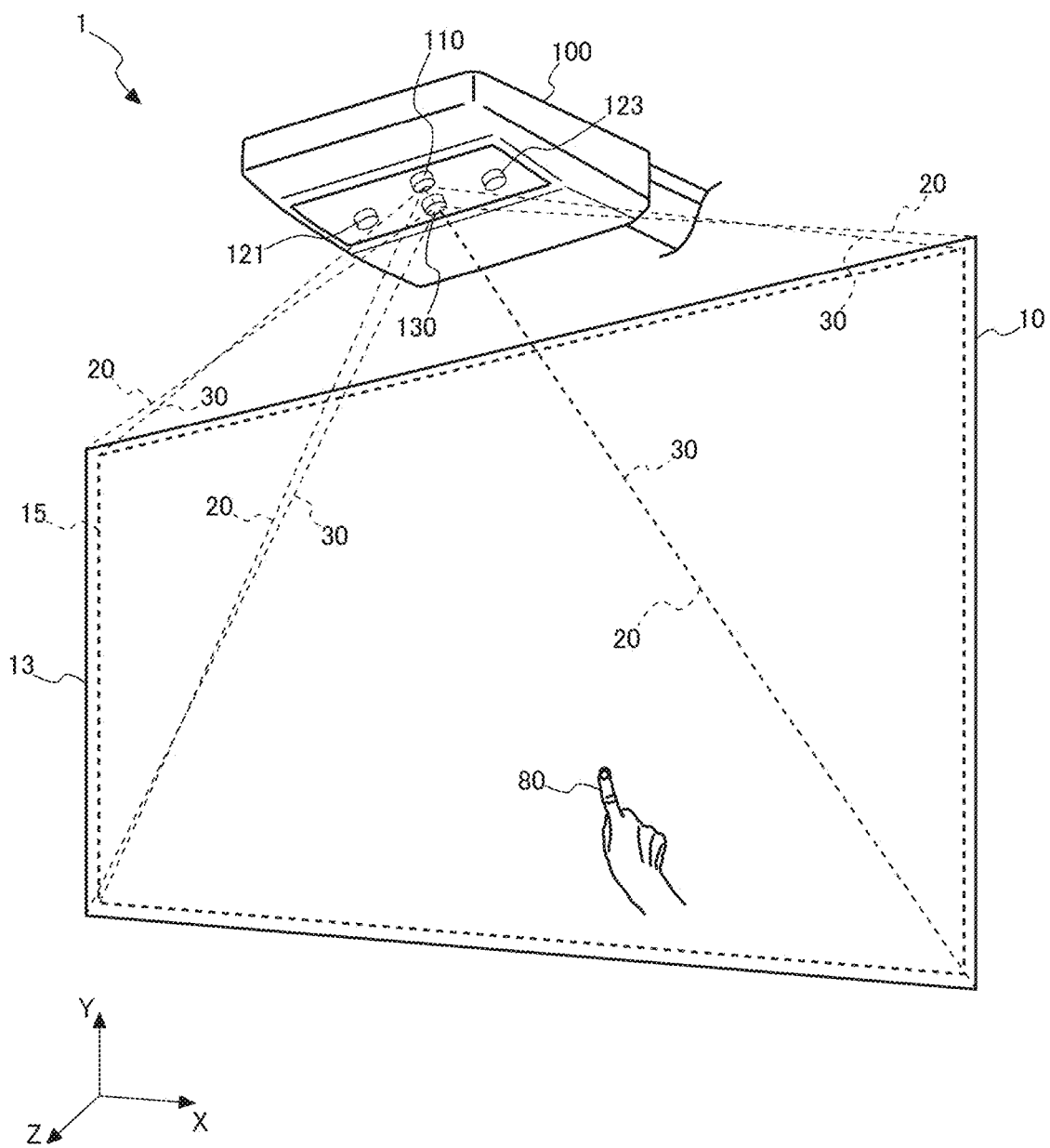
FIG. 1 is a perspective view of an interactive projection system.

FIG. 1 is a perspective view of an interactive projection system 1.

The interactive projection system 1 is provided with a projector 100 and a projection surface 10 on which the projector 100 projects an image. Hereinafter, the description will be presented assuming a normal direction of the projection surface 10 and a front side of the projection surface 10 as a Z-axis direction, a vertically upward direction along the projection surface 10 as a Y-axis direction, and a direction perpendicular to the Z-axis direction and the Y-axis direction as an X-axis direction. The projection surface 10 corresponds to an X-Y plane with Z=0. Further, the projection surface 10 is a display surface on which image light 30 projected by the projector 100 is displayed, and the projector 100 is an example of a display device.

The projector 100 generates the image light 30 corresponding to image data, and then projects the image light 30 thus generated on the projection surface 10. Further, the projector 100 is provided with an interactive function. The interactive function means a function of detecting an operation position of an operation performed by the user on the projection surface 10 with a pointing element 80 to display an image corresponding to the position or the trajectory of the pointing element 80 based on the operation position thus detected, or to make a change to the image displayed.

The projector 100 is provided with a projection section 110 for projecting the image light 30 from a projection opening, a first camera 121 and a second camera 123 for taking an image of the projection surface 10, and a detection light irradiation section 130 for performing irradiation with detection light 20 used for the detection of the pointing element 80. The first camera 121 corresponds to a first imaging section in the present disclosure, and the second camera 123 corresponds to a second imaging section in the present disclosure.

Although when the projection surface 10 on which the projector 100 projects the image light 30 is a screen formed of a flat surface is described in the present embodiment, a flat surface fixed to a wall surface or the like can also be used as the projection surface 10. Further, it is also possible for the projection surface 10 to be a curtain-like screen of a suspended type, a rising type, or the like. Further, it is also possible to use an indoor wall surface, a white board, a block board, and so on as the projection surface 10. Further, a front surface of the projection surface 10 is used as an operation surface 13 to be used for input of an operation using the pointing element 80.

Figure 2:
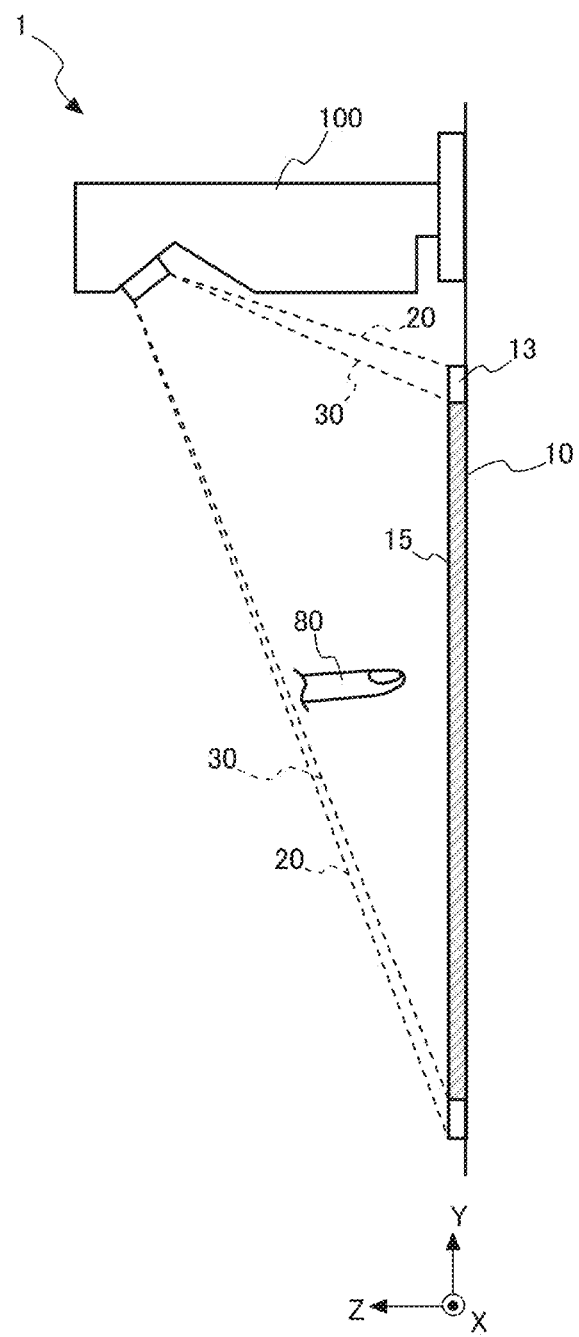
FIG. 2 is a side view showing an installation condition of a projector.

FIG. 2 is a side view of the interactive projection system 1.

The projector 100 in the present embodiment is fixed to the wall surface and is installed in front of and above the projection surface 10, and projects the image light 30 toward the projection surface 10 located on an obliquely downside. An area where the image light 30 is projected by the projector 100 in the projection surface 10 is referred to as a projection area 15. Further, the projector 100 performs irradiation with the detection light 20 in a direction corresponding to the operation surface 13. The detection light 20 is the light used for detecting the pointing element 80, and infrared light is used as the detection light 20 in the preset embodiment. By using the infrared light, it is possible to detect the pointing element 80 without being affected by the image light 30 mainly consisting of visible light, and further, no influence is made on the display with the image light 30. A range including at least a part of the projection surface 10 is irradiated with the detection light 20. In the present embodiment, a range covering the entire area of the projection surface 10 is irradiated. The direction corresponding to the operation surface 13 means a direction in which the operation of the pointing element 80 can be detected by an imaging section 120. More specifically, the direction corresponding to the operation surface 13 means a direction in which reflected light reflected by the pointing element 80 having approached within a predetermined distance from the operation surface 13 can be taken by the imaging section 120.

The first camera 121 and the second camera 123 are disposed at positions different from each other in the projector 100. The first camera 121 and the second camera 123 image the projection surface 10 from respective imaging viewpoints different from each other to thereby function as a stereo camera. In the present embodiment, the first camera 121 is disposed on the left side of the projection section 110 of the projector 100 so as to correspond to the projection surface 10, and the second camera 123 is disposed on the right side of the projection section 110 of the projector 100 so as to correspond to the projection surface 10. The first camera 121 is a left camera, and the taken image by the first camera 121 is referred to as a left taken image 211. Further, the second camera 123 is a right camera, and the taken image by the second camera 123 is referred to as a right taken image 213. The left taken image corresponds to a first taken image in the present disclosure, and the right taken image corresponds to a second taken image in the present disclosure.

The projector 100 images the projection surface 10 with the first camera 121 and the second camera 123 to detect the reflected light as the detection light 20 reflected by the pointing element 80. In the interactive projection system 1, it is possible to use at least one pointing element 80 of a non-light emitting type. As the pointing element 80, it is possible to use a non-light emitting object such as a finger or a pen. The pointing element 80 of the non-light emitting type is not particularly limited providing the infrared light is reflected by the pointing element 80, and in the present embodiment, there is described an example in which a finger of the user is used as the pointing element 80.

The first camera 121 and the second camera 123 are each set so as to be able to image the entire area of the projection surface 10, and each have a function of taking the image of the pointing element 80 with the projection surface 10 as a background. In other words, the first camera 121 and the second camera 123 each receive the light reflected by the projection surface 10 and the pointing element 80 out of the detection light 20 emitted from the detection light irradiation section 130 to thereby form the image including the pointing element 80. When using the two images respectively taken by the first camera 121 and the second camera 123, it is possible to obtain a three-dimensional position of the pointing element 80 using triangulation or the like. It should be noted that the number of the cameras can also be three or more.

A-2. Configuration of Projector

Figure 3:
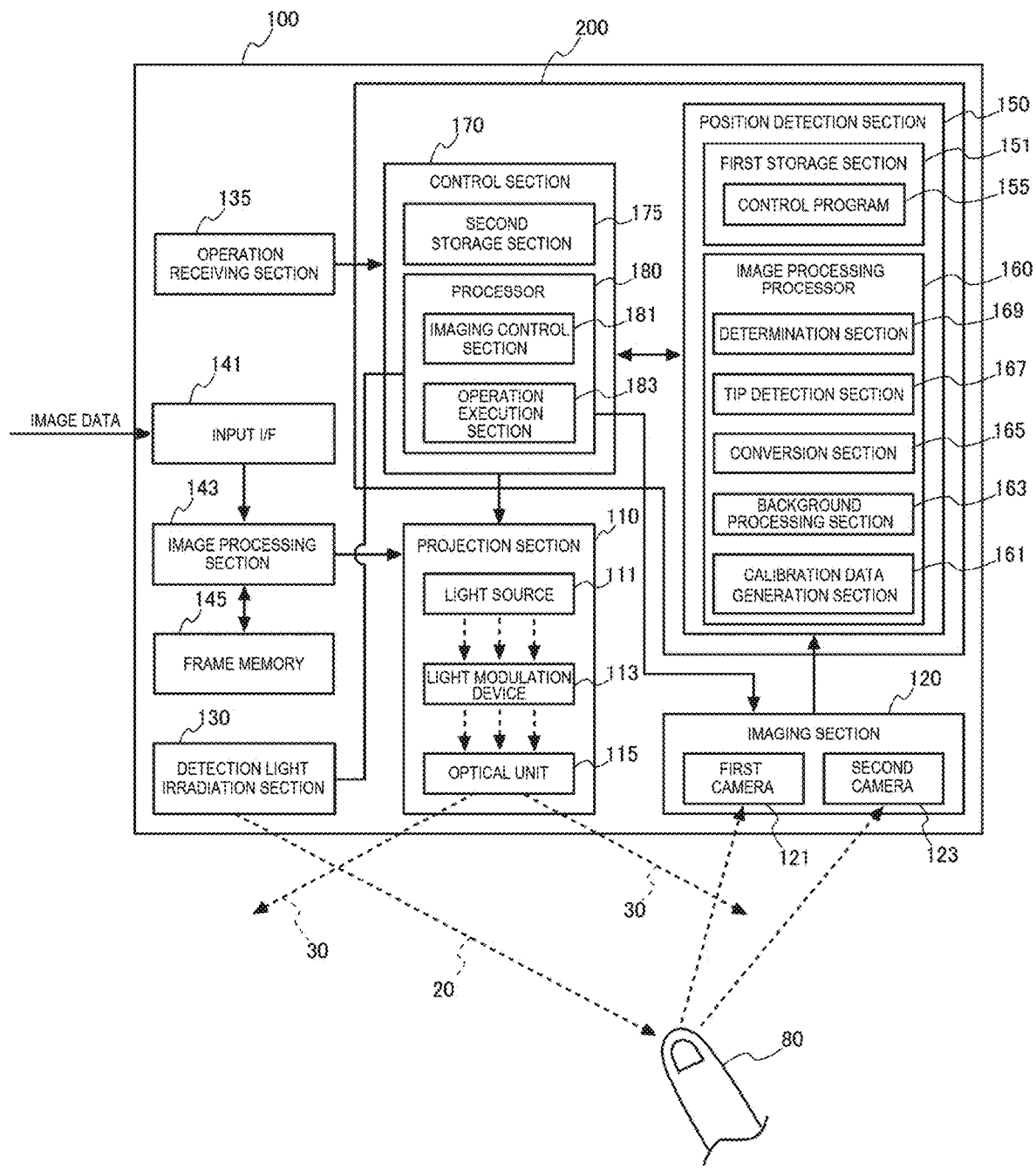
FIG. 3 is a block diagram showing a configuration of the projector.

FIG. 3 is a block diagram showing a configuration of the projector 100.

The projector 100 is provided with the projection section 110, the imaging section 120, the detection light irradiation section 130, an operation receiving section 135, an input interface 141, an image processing section 143, a frame memory 145, a position detection section 150, and a control section 170. The position detection section 150 and the control section 170 operate as a position detection device 200. The projection section 110 is an example of a display section.

The projection section 110 is provided with a light source 111, a light modulation device 113, and an optical unit 115.

As the light source 111, there is used a lamp light source such as a halogen lamp, a xenon lamp, or a super high-pressure mercury lamp. Further, as the light source 111, there can also be used a solid-state light source such as an LED (Light Emitting Diode) or a laser source.

The light modulation device 113 is provided with a light modulation element for modulating light emitted by the light source 111 to generate the image light 30. As the light modulation element, it is possible to use, for example, a transmissive liquid crystal light valve, a reflective liquid crystal light valve, or a digital mirror device.

The optical unit 115 is provided with an optical element such as a lens or a mirror, and projects the image light 30 generated by the light modulation device 113 on the projection surface 10 in an enlarged manner. The image obtained by the image light 30 forming an image on the projection surface 10 is visually recognized by the user.

The imaging section 120 is provided with the first camera 121 and the second camera 123.

The first camera 121 and the second camera 123 are each provided with an imaging element for converting the light collected by the optical system such as a lens into an electric signal such as a CCD (Charge Coupled Device) or a CMOS (Complementary Metal Oxide Semiconductor).

The first camera 121 and the second camera 123 are disposed so as to be able to image the reflected light as the detection light 20 reflected by the pointing element 80. Further, to the first camera 121 and the second camera 123, there are attached infrared filters for receiving the reflected light of the detection light 20.

The first camera 121 and the second camera 123 each take an image of a range including the operation surface 13. The first camera 121 and the second camera 123 each take an image of the range including the operation surface 13 at a predetermined frame rate, and then output the taken images thus formed to the position detection section 150. The taken images are stored in a first storage section 151 provided to the position detection section 150, and are then processed by the position detection section 150. When the user makes the pointing element 80 approach the projection surface 10, the reflected light as the detection light 20 emitted by the detection light irradiation section 130 and then reflected by the pointing element 80 is imaged in the taken image by the imaging section 120.

The detection light irradiation section 130 has an LD (Laser Diode) or an LED as the light source for emitting the infrared light. Further, it is also possible for the detection light irradiation section 130 to be provided with an optical component for diffusing the infrared light emitted by the light source toward the projection surface 10. In the detection light irradiation section 130, it is possible to dispose one emission opening for emitting the detection light 20, and install the emission opening at a position between the first camera 121 and the second camera 123. Further, in the detection light irradiation 130, it is also possible to dispose two or more emission openings, and install the emission openings at positions corresponding respectively to the first camera 121 and the second camera 123. For example, by disposing the emission openings respectively adjacent to the first camera 121 and the second camera 123, and adjusting the timings of light emission and imaging, it is possible to improve the contrast in the taken images.

The operation receiving section 135 receives an infrared signal transmitted by a remote controller not shown. The operation receiving section 135 outputs an operation signal corresponding to the infrared signal thus received from the remote controller to the control section 170. The operation signal is a signal corresponding to a switch of the remote controller operated.

The input interface 141 is a connection interface with an external device. The input interface 141 is provided with a connector to which a cable is coupled and an interface circuit for performing signal processing. The input interface 141 receives image data supplied from the external device coupled. The input interface 141 outputs the image data thus received to the image processing section 143.

The image data thus input is developed in the frame memory 145 by the image processing section 143. The frame memory 145 is formed of, for example, an SDRAM (Synchronous Dynamic Random Access Memory).

The image processing section 143 performs image processing on the image data having been developed in the frame memory 145. In the image processing performed by the image processing section 143, there are included, for example, a resolution conversion process or a resizing process, correction of a distortion aberration, a shape correction process, a digital zooming process, and an adjustment of the color shade or the luminance of the image. The image processing section 143 executes the process designated by the control section 170, and executes the process using a parameter input from the control section 170 as needed. Further, it is obviously possible for the image processing section 143 to execute two or more of the processes described above in combination with each other. The image processing section 143 retrieves the image data from the frame memory 145, and then outputs the image data thus retrieved to the projection section 110.

The image processing section 143 and the frame memory 145 are formed of, for example, an integrated circuit. The integrated circuit includes an LSI, an ASIC (Application Specific Integrated Circuit), a PLD (Programmable Logic Device), an FPGA (Field-Programmable Gate Array), an SoC (System-on-a-Chip), and so on. Further, it is also possible for an analog circuit to be included in a part of the configuration of the integrated circuit, or it is also possible to adopt a configuration having the control section 170 and the integrated circuit combined with each other.

The position detection section 150 is provided with the first storage section 151 and an image processing processor 160.

The first storage section 151 is formed of, for example, volatile and non-volatile semiconductor storage devices, or a non-volatile semiconductor storage device. The first storage section 151 stores a control program 155 to be executed by the image processing processor 160. Further, the first storage section 151 stores a calibration image 201, calibration data, and a background image described later.

The image processing processor 160 is formed of a dedicated processor used for real-time digital image processing such as a GPU (Graphics Processing Unit). Further, the image processing processor 160 can also be formed of, for example, a DSP (Digital Signal Processor), an integrated circuit, or other digital circuits. The integrated circuit includes an LSI, an ASIC, a PLD, an FPGA, an SoC, and so on.

The position detection section 150 is provided with a calibration data generation section 161, a background processing section 163, a conversion section 165, a tip detection section 167, and a determination section 169 as functional blocks. These functional blocks represent the functions realized by the image processing processor 160 executing the command set described in the control program to perform arithmetic operations and control with the blocks for descriptive purposes.

Figure 4:
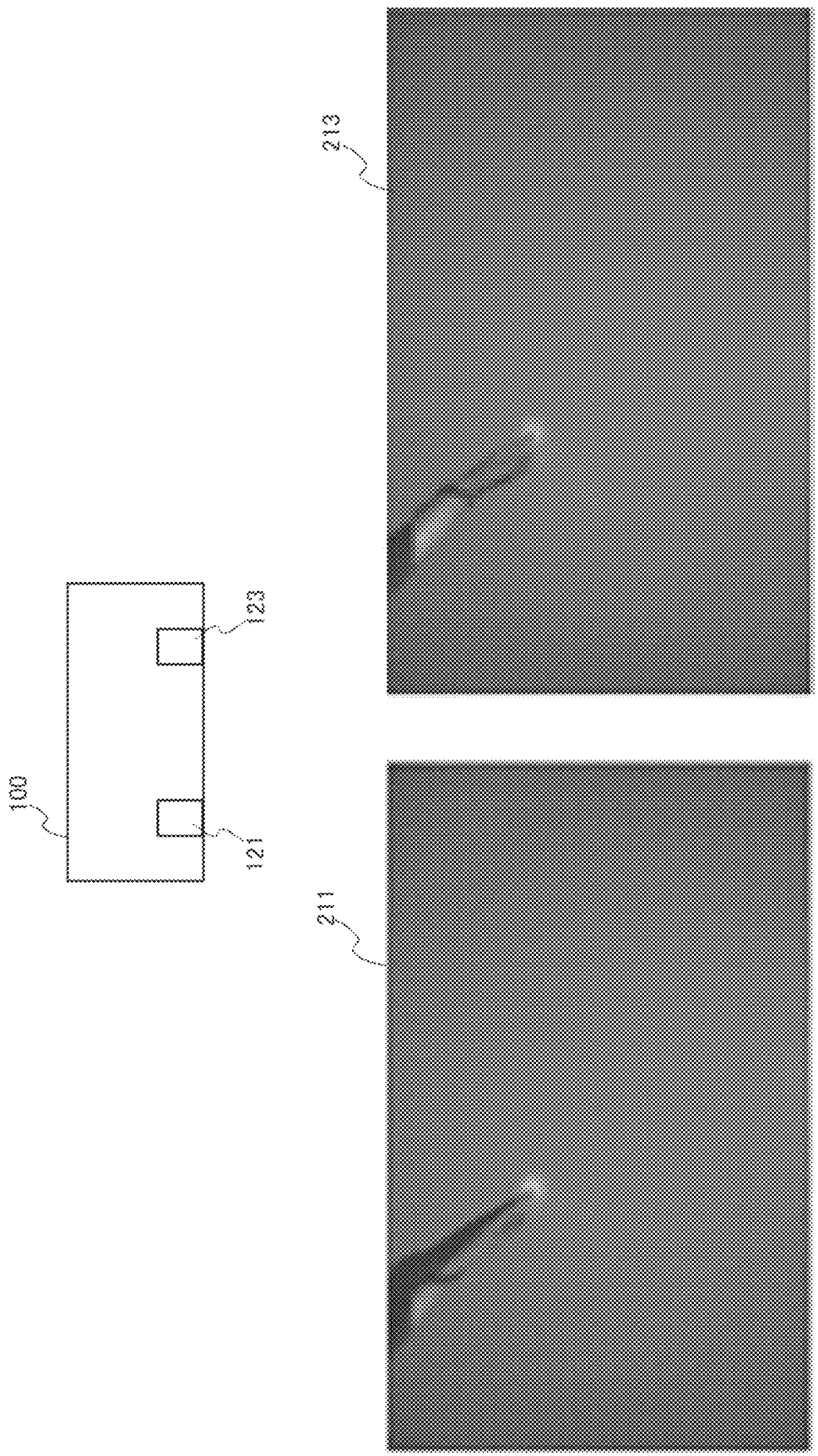
FIG. 4 is a diagram showing a left taken image and a right taken image.

To the position detection section 150, there are input the left taken image 211 formed by the first camera 121 and the right taken image 213 formed by the second camera 123. The position detection section 150 makes the first storage section 151 temporarily store the left taken image 211 and the right taken image 213 thus input. FIG. 4 shows an example of the left taken image 211 and the right taken image 213. The left taken image 211 and the right taken image 213 shown in FIG. 4 are each an image obtained by imaging the finger of the user as the pointing element 80. More specifically, FIG. 4 shows the images respectively obtained by the first camera 121 and the second camera 123 imaging the range including fingers, a hand, and an arm at the same timing with the operation surface 13 as a background.

The calibration data generation section 161 generates calibration data. The calibration data includes first range information, second range information, a first image conversion coefficient, and a second image conversion coefficient.

The first range information is information representing a range of the projection area 15 in the left taken image 211. The second range information is information representing a range of the projection area 15 in the right taken image 213. The first image conversion coefficient is a coefficient for converting the shape of the image extracted from the left taken image 211 based on the first range information into a rectangular shape. The second image conversion coefficient is a coefficient for converting the shape of the image extracted from the right taken image 213 based on the second range information into a rectangular shape. The details of a method of generating the calibration data will be described later.

The background processing section 163 corresponds to an acquisition section and a removal processing section in the present disclosure, and performs a process corresponding to an acquisition step and a removal step.

When the first camera 121 and the second camera 123 start imaging, and the operation by the pointing element 80 is started, the background processing section 163 obtains the left taken image 211 formed by the first camera 121 and the right taken image 213 formed by the second camera 123 as an action corresponding to the acquisition step. The background processing section 163 retrieves the left taken image 211 and the right taken image 213 from the first storage section 151.

Figure 5:
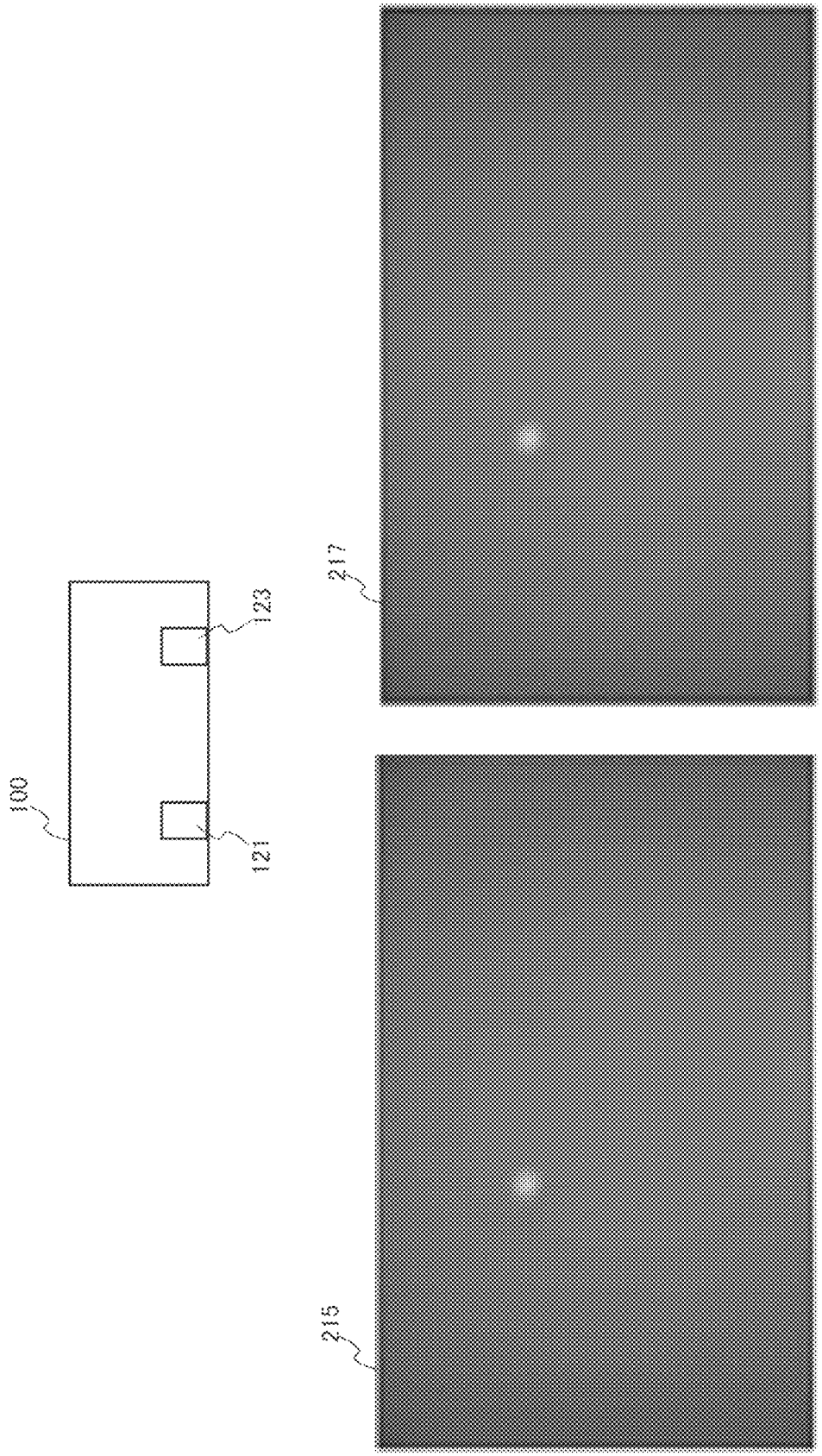
FIG. 5 is a diagram showing a left background image and a right background image.

FIG. 5 is a diagram showing a left background image 215 and a right background image 217.

The background processing section 163 retrieves a background image from the first storage section 151. The background image includes the left background image 215 and the right background image 217. The left background image 215 is the taken image by the first camera 121, and is an image obtained by imaging the projection area 15 before the operation by the pointing element 80 is started. The left background image 215 is an image in which the pointing element 80 is not imaged, and only the projection area 15 to be the background is imaged. The right background image 217 is the taken image by the second camera 123, and is an image obtained by imaging the projection area 15 before the operation by the pointing element 80 is started. The right background image 217 is an image in which the pointing element 80 is not imaged, and only the projection area 15 to be the background is imaged.

Regarding the left background image 215 and the right background image 217, it is possible for the control section 170 to make the first camera 121 and the second camera 123 perform imaging when generating the calibration data to form the left background image 215 and the right background image 217. Further, it is also possible for the control section 170 to make the first camera 121 and the second camera 123 perform imaging every predetermined period of time to form the left background image 215 and the right background image 217. The left background image 215 corresponds to a first background image in the present disclosure, and the right background image 217 corresponds to a second background image in the present disclosure.

Then, the background processing section 163 respectively detects the edges of the left taken image 211, the right taken image 213, the left background image 215, and the right background image 217 using an image filter for edge detection such as a Sobel filter as a process corresponding to the removal step. The background processing section 163 divides the luminance difference between a starting point and an ending point of an edge thus detected by a distance between the starting point and the ending point to thereby calculate the luminance gradient. The luminance gradient includes information of a direction of the gradient and the amplitude of the gradient. The background processing section 163 calculates the luminance gradient with respect to each of the left background image 215, the right background image 217, the left taken image 211, and the right taken image 213.

Then, when the background processing section 163 has calculated the luminance gradients, the background processing section 163 makes a map representing a degree of coincidence in the luminance gradient based on the luminance gradients thus calculated. For example, the background processing section 163 represents the gradient of the luminance in a cell obtained by dividing the left background image 215, the right background image 217, the left taken image 211, and the right taken image 213 by a predetermined number of pixels as a histogram to thereby make luminance gradient histograms. It is also possible for the background processing section 163 to make a map representing the degree of coincidence in the luminance gradient based on the luminance histograms thus made.

Figure 6:
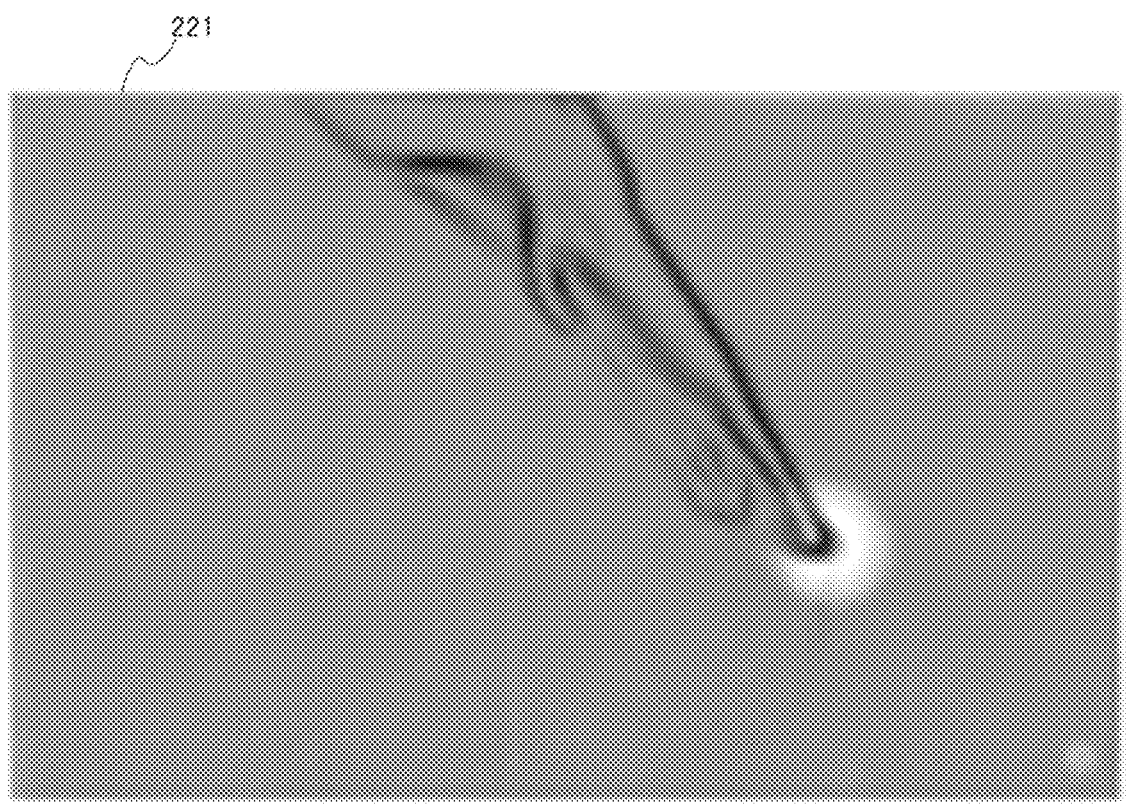
FIG. 6 is a diagram showing a first luminance gradient map.
Figure 7:
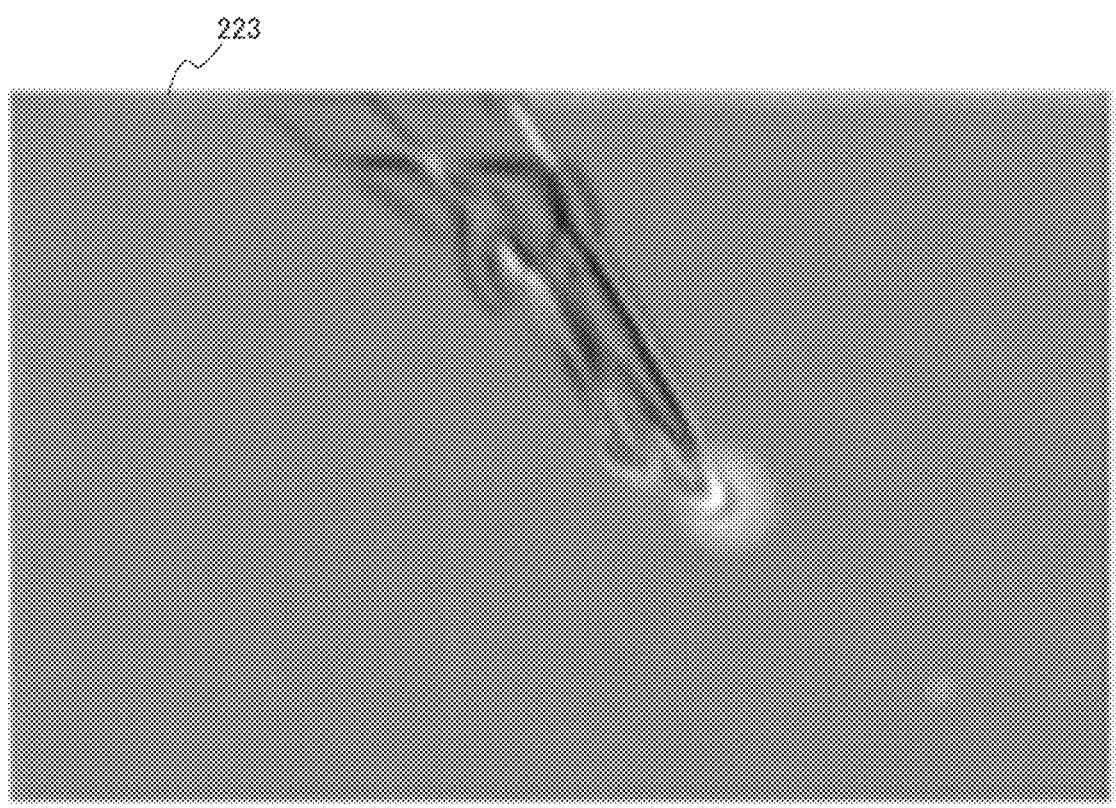
FIG. 7 is a diagram showing a second luminance gradient map.
Figure 8:
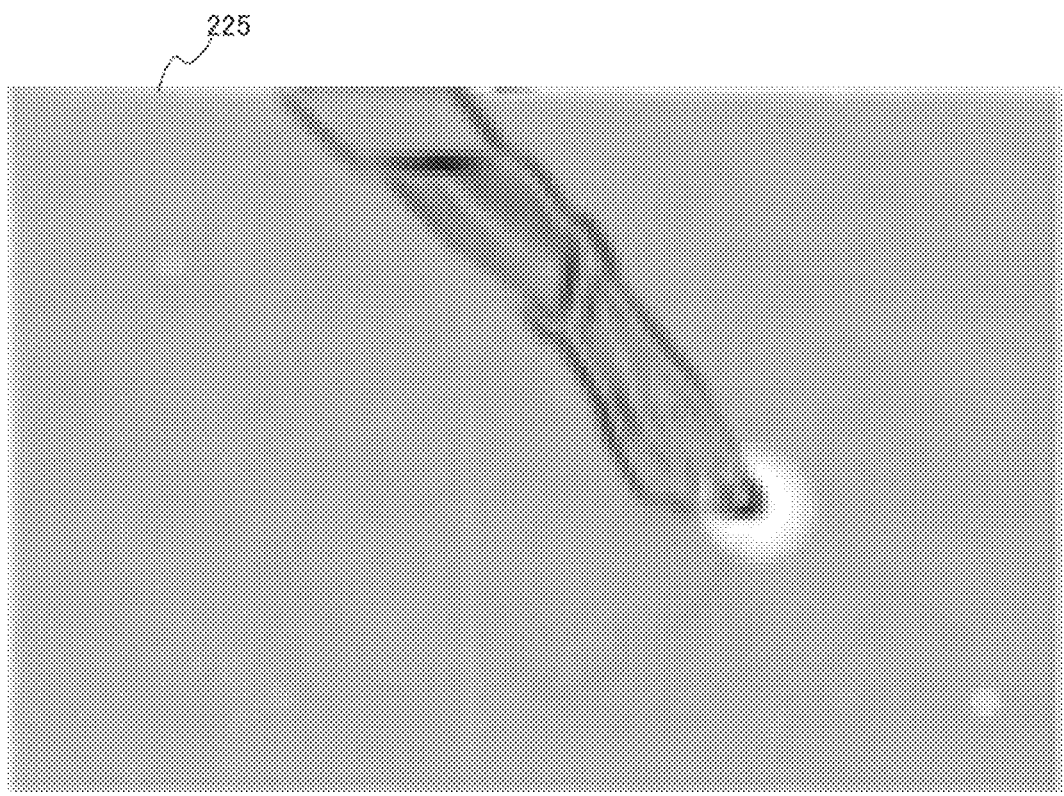
FIG. 8 is a diagram showing a third luminance gradient map.

FIG. 6 is a diagram showing a first luminance gradient map 221. FIG. 7 is a diagram showing a second luminance gradient map 223. FIG. 8 is a diagram showing a third luminance gradient map 225.

The background processing section 163 firstly compares the luminance gradient of the left taken image 211 and the luminance gradient of the left background image 215 with each other to make a map representing the degree of coincidence in the luminance gradient. This map is referred to as the first luminance gradient map 221. Further, the background processing section 163 compares the luminance gradient of the left taken image 211 and the luminance gradient of the right taken image 213 with each other to make a map representing the degree of coincidence in the luminance gradient. This map is referred to as the second luminance gradient map 223. Further, the background processing section 163 compares the right taken image 213 and the right background image 217 with each other to make a map representing the degree of coincidence in the luminance gradient. This map is referred to as the third luminance gradient map 225.

In the first luminance gradient map 221, the second luminance gradient map 223, and the third luminance gradient map 225, areas high in degree of coincidence in the direction and the amplitude of the luminance gradient are displayed as white, and areas low in degree of coincidence in the direction and the amplitude of the luminance gradient are display as black.

For example, the outside light such as sunlight is imaged in the left background image 215, the right background image 217, the left taken image 211, and the right taken image 213. Therefore, the area where the outside light is imaged in the first luminance gradient map 221 is displayed as white. Similarly, in the second luminance gradient map 223 and the third luminance gradient map 225, the areas where the outside light is imaged are displayed as white.

Further, the pointing element 80 is not imaged in the left background image 215 and the right background image 217, but is imaged in the left take image 211 and the right taken image 213. Therefore, the areas in the first luminance gradient map 221 and the third luminance gradient map 225 corresponding to the areas where the pointing element 80 is imaged in the left taken image 211 and the right taken image 213 are displayed as black. Further, the area in the second luminance gradient map 223 corresponding to the area where the pointing element 80 is imaged in the left taken image 211 and the right taken image 213 is displayed as black.

Figure 9:
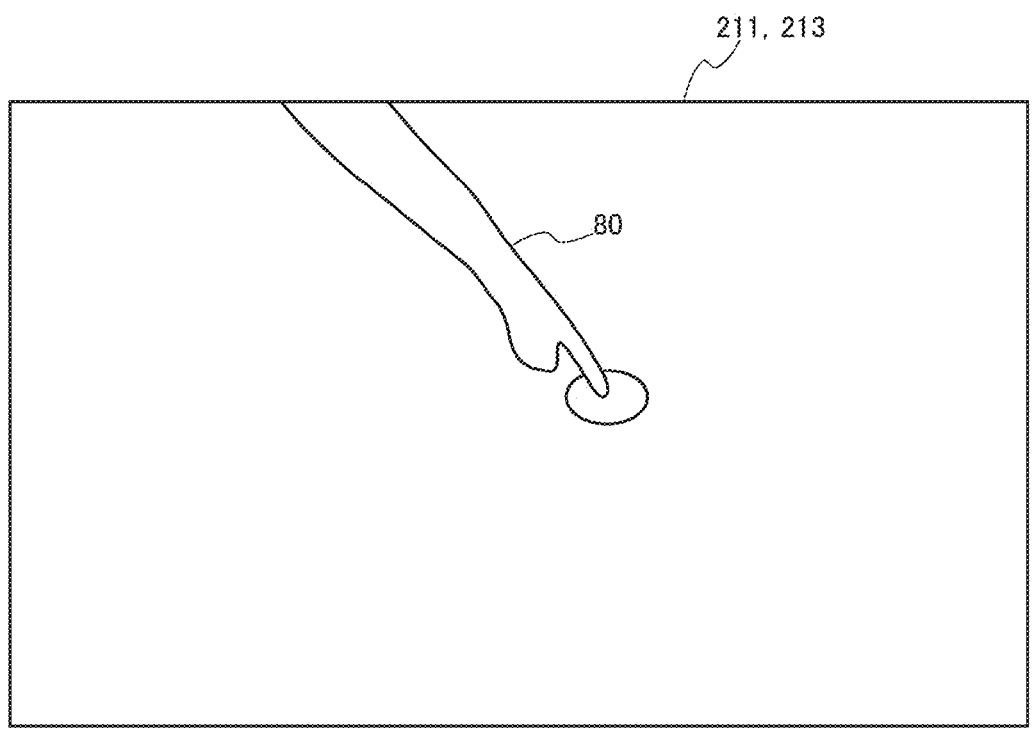
FIG. 9 is a diagram showing a taken image in which a noise is imaged.
Figure 10:
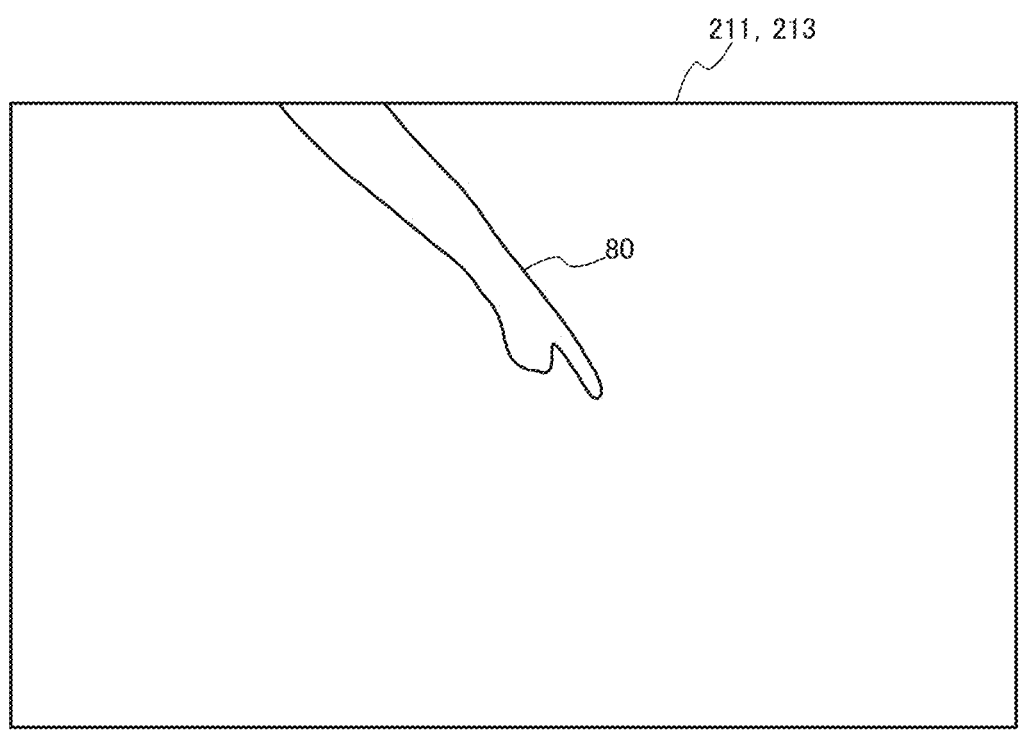
FIG. 10 is a diagram showing a state in which an image in a noise area is removed.

FIG. 9 is a diagram showing a taken image in which a noise such as the outside light is imaged. Further, FIG. 10 is a diagram showing the state in which the image in the area where the noise is imaged is removed from the taken image shown in FIG. 9.

The background processing section 163 determines that the area which is the same or substantially the same among the first luminance gradient map 221, the second luminance gradient map 223, and the third gradient map 225, and is displayed as while is the area where the noise component such as the outside light is imaged. This area is referred to as a noise area. The background processing section 163 removes the images corresponding to the noise area thus determined in the left taken image 211 and the right taken image 213. Further, it is also possible for the background processing section 163 to determine that the noise area is an exclusion area to be excluded from the target to be detected as a fingertip area 270. The fingertip area 270 is an area where the tip of the pointing element 80 is imaged. The background processing section 163 notifies the tip detection section 167 of the information of the exclusion area.

Figure 11:
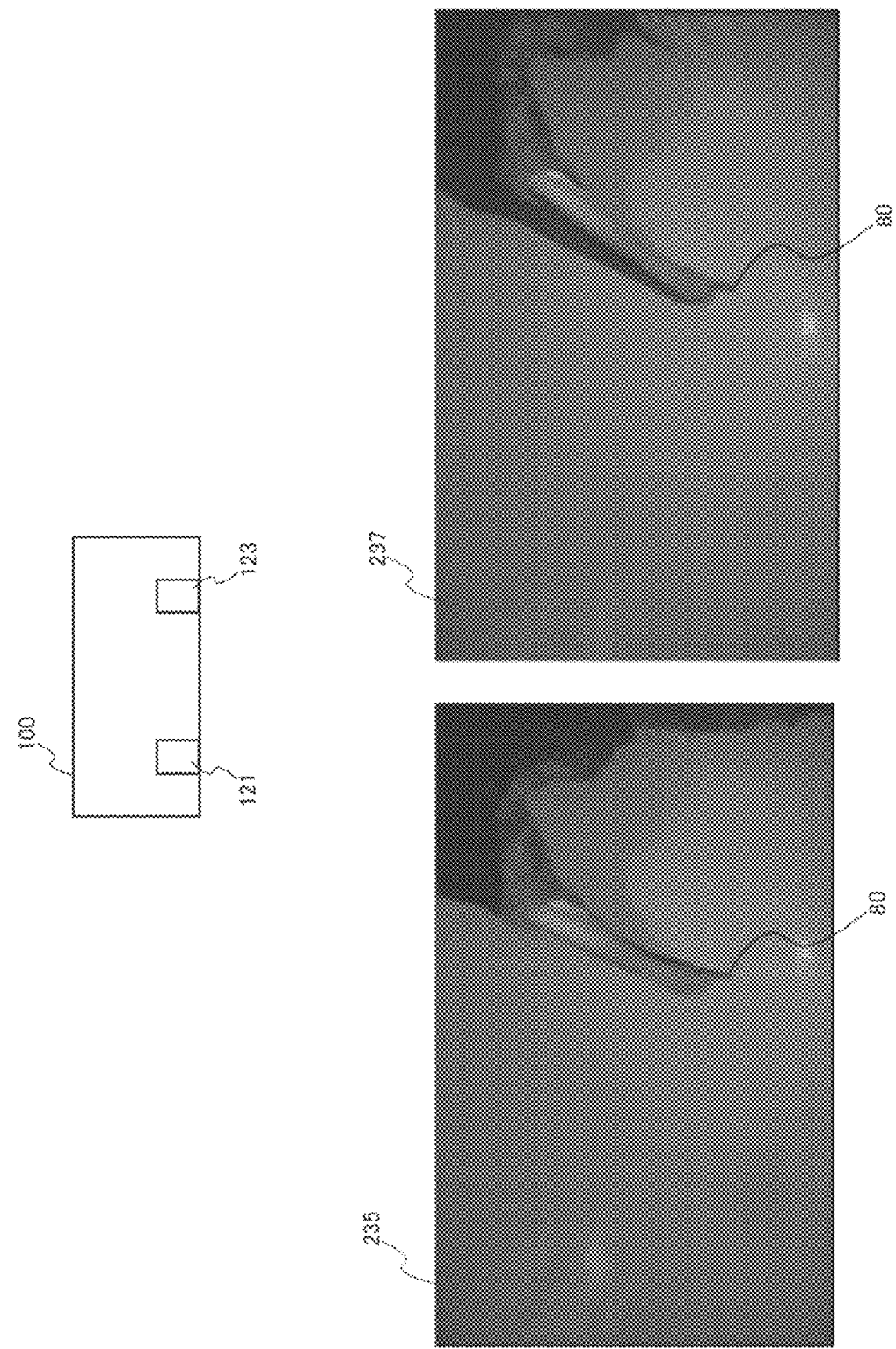
FIG. 11 is a diagram showing a left rectangular image and a right rectangular image.

FIG. 11 is a diagram showing a left rectangular image 235 and a right rectangular image 237.

The conversion section 165 performs an action corresponding to the conversion step in the present disclosure. The conversion section 165 converts the left taken image 211 and the right taken image 213 into the left rectangular image 235 and the right rectangular image 237 as the taken images calibrated with respect to the operation surface 13 using the calibration data. The left taken image 211 and the right taken image 213 to be converted by the conversion section 165 are the taken images with the noise removed by the background processing section 163.

The taken image calibrated with respect to the operation surface 13 means an image adjusted so that the disparity on the operation surface 13 becomes 0. The tip detection section 167 clips an image corresponding to the projection area 15 from the left taken image 211 using the first range information, and then converts the image thus clipped into the left rectangular image 235 using the first image conversion coefficient. Further, the tip detection section 167 clips an image corresponding to the projection area 15 from the right taken image 213 using the second range information, and then converts the image thus clipped into the right rectangular image 237 using the second image conversion coefficient. The left rectangular image 235 and the right rectangular image 237 are each a rectangular image, and is an image adjusted so that the disparity becomes 0 at the position where Z=0 is true which is the position of the operation surface 13. Further, regarding the disparity between the left rectangular image 235 and the right rectangular image 237, the more distant on the front side of the operation surface 13, namely in the positive direction on the Z axis, the object is, the larger the disparity becomes. The reason that the disparity on the operation surface 13 between the left rectangular image 235 and the right rectangular image 237 is adjusted to 0 will be described later.

The tip detection section 167 corresponds to a formation section, an extraction section, and a detection section in the present disclosure, and performs a process corresponding to a formation step, an extraction step, and a detection step in the present disclosure.

The process corresponding to the formation step executed by the tip detection section 167 is a process of forming a difference image 240 based on the left rectangular image 235 and the right rectangular image 237. The tip detection section 167 forms the difference image 240 between the left rectangular image 235 and the right rectangular image 237. The tip detection section 167 forms the difference image 240 by, for example, subtracting the right rectangular image 237 from the left rectangular image 235. It should be noted that although when forming the difference image 240 by subtracting the right rectangular image 237 from the left rectangular image 235 is described in the present embodiment, it is also possible to form the difference image 240 by subtracting the left rectangular image 235 from the right rectangular image 237.

Figure 12:
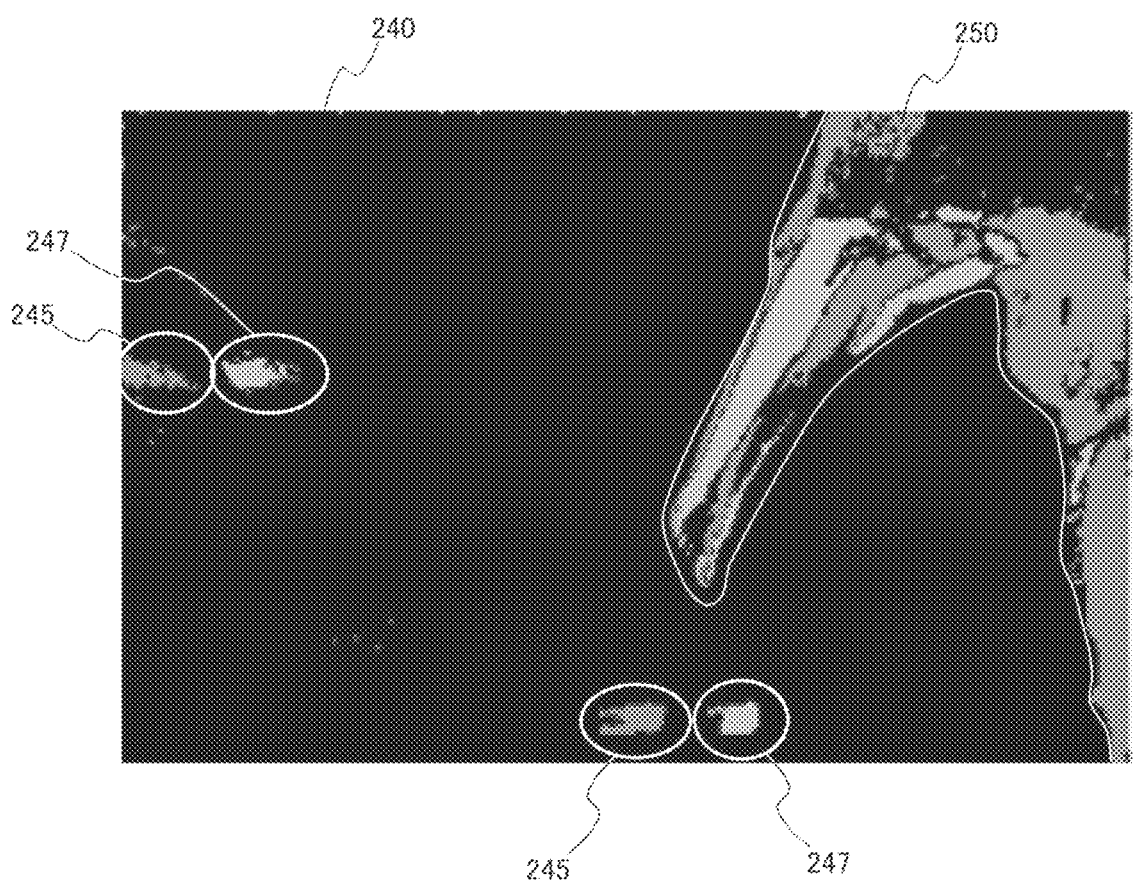
FIG. 12 is a diagram showing a difference image.

FIG. 12 is a diagram showing the difference image 240.

The difference image 240 is an image obtained by subtracting the right rectangular image 237 from the left rectangular image 235. Further, the left rectangular image 235 and the right rectangular image 237 are calibrated with respect to the operation surface 13 to be adjusted so that the disparity on the operation surface 13 becomes 0. Therefore, the object which is located at the position where Z=0 is true as the position of the projection surface 10, and the disparity of which becomes 0 is not displayed in the difference image 240. Further, the more distant from the projection surface 10 the position where the object exists is, the larger the disparity becomes, and the larger the difference between the position of the object in the left rectangular image 235 and the position of the object in the right rectangular image 237 becomes.

Further, the process corresponding to the extraction step executed by the tip detection section 167 is a process of extracting the change area 250 from the difference image 240, wherein the change area 250 is a candidate area in which the image of the pointing element 80 is included.

Firstly, the tip detection section 167 separates the difference image 240 into a background area and a foreground area. In order to separate the difference image 240 into the background area and the foreground area, the tip detection section 167 calculates a variance value of the difference image 240. For example, the tip detection section 167 calculates the variance of the pixel values of the pixels constituting the difference image 240 to make a variance value map.

Then, the tip detection section 167 separates the difference image 240 into the foreground area and the background area based on the variance value map thus made. In the present embodiment, the background area is an area lower in variance value than a threshold value in the variance value map, and is specifically an area where the projection surface 10 and so on are imaged. Further, the foreground area is an area other than the background area, and is an area no lower in variance value than a predetermined threshold value in the variance value map. More specifically, the foreground area is an area where the hand and the arm of the user are imaged.

When the tip detection section 167 has made the variance value map, the tip detection section 167 separates the difference image 240 into the background area and the foreground area based on the variance value map thus made. The tip detection section 167 determines that the area no lower in variance value than the threshold value is the foreground area, and determines that the area lower in variance value than the threshold value is the background area.

Figure 13:
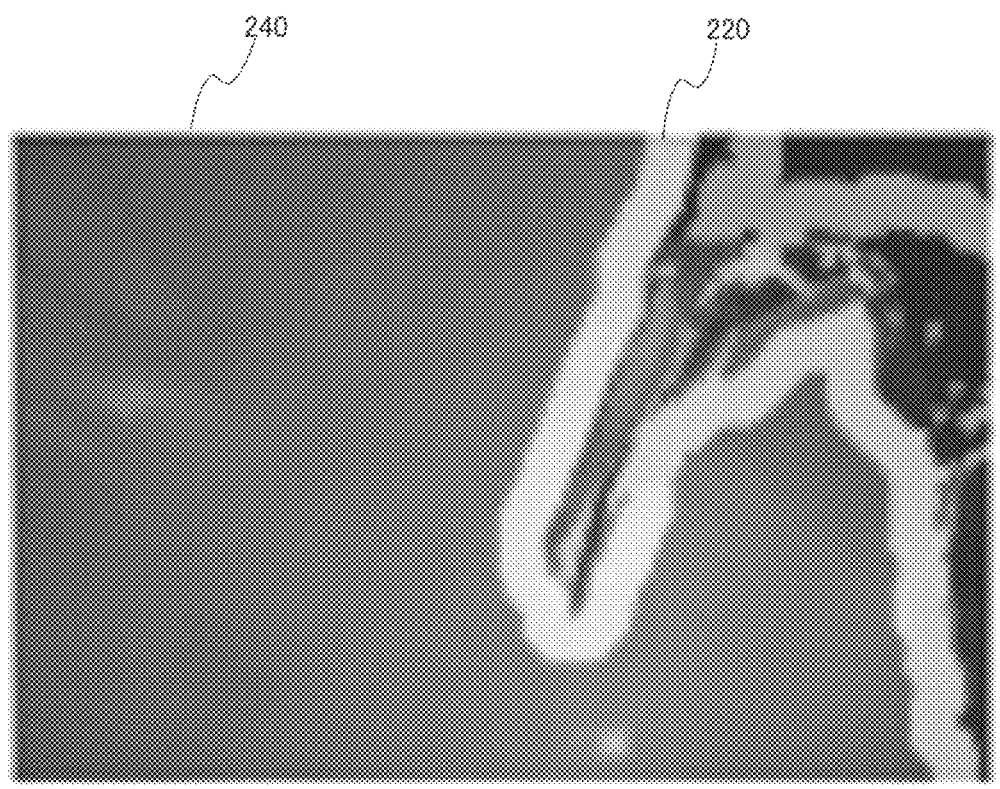
FIG. 13 is a diagram showing a boundary area.

FIG. 13 is a diagram showing a boundary area 220 between the foreground area and the background area.

When the tip detection section 167 has separated the difference image 240 into the foreground area and the background area, the tip detection section 167 sets a predetermined area including a boundary line between the foreground area and the background area as the boundary area 220. The tip detection section 167 sets an area with a predetermined width and located on the foreground area side of the boundary line between the foreground area and the background area and an area with a predetermined width and located on the background area side of the boundary line as the boundary area 220.

Figure 14:
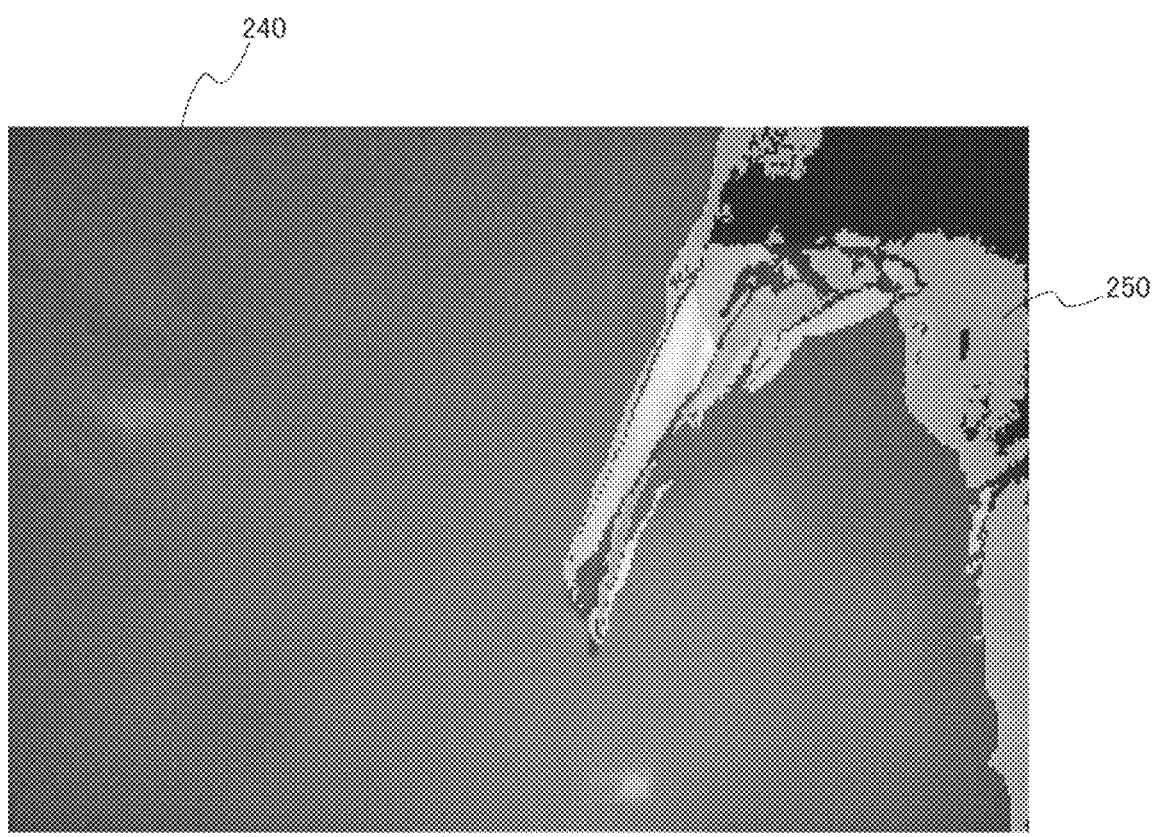
FIG. 14 is a diagram showing a difference image with a positive area and a negative area removed.

FIG. 14 is a diagram showing the difference image 240 with a positive area 245 and a negative area 247 removed.

The tip detection section 167 removes an area of the image where only the positive area 245 exists alone and an area of the image where only the negative area 247 exists alone in the difference image 240 thus formed. The difference image 240 is an image formed by subtracting the right rectangular image 237 from the left rectangular image 235. When the same object is imaged in the left rectangular image 235 and the right rectangular image 237, and when the coordinate of the left rectangular image 235 where the object is imaged is larger than the coordinate of the right rectangular image 237 where the object is imaged, the positive area 245 occurs in the difference image 240. Further, when the coordinate of the right rectangular image 237 where the object is imaged is larger than the coordinate of the left rectangular image 235 where the object is imaged, the negative area 247 occurs in the difference image 240.

By removing the positive area 245 and the negative area 247 existing alone, only the area where the positive area 245 and the negative area 247 exist adjacent to each other with a distance no larger than a predetermined distance remains in the difference image 240. The area where the positive area 245 and the negative area 247 exist adjacent to each other with the distance no larger than the predetermined distance is referred to as an adjacency area. The adjacency area corresponds to an area where an amount of the disparity between the left rectangular image 235 and the right rectangular image 237 is within a predetermined range, and an area where the object existing near to the projection surface 10 is imaged.

Figure 15:
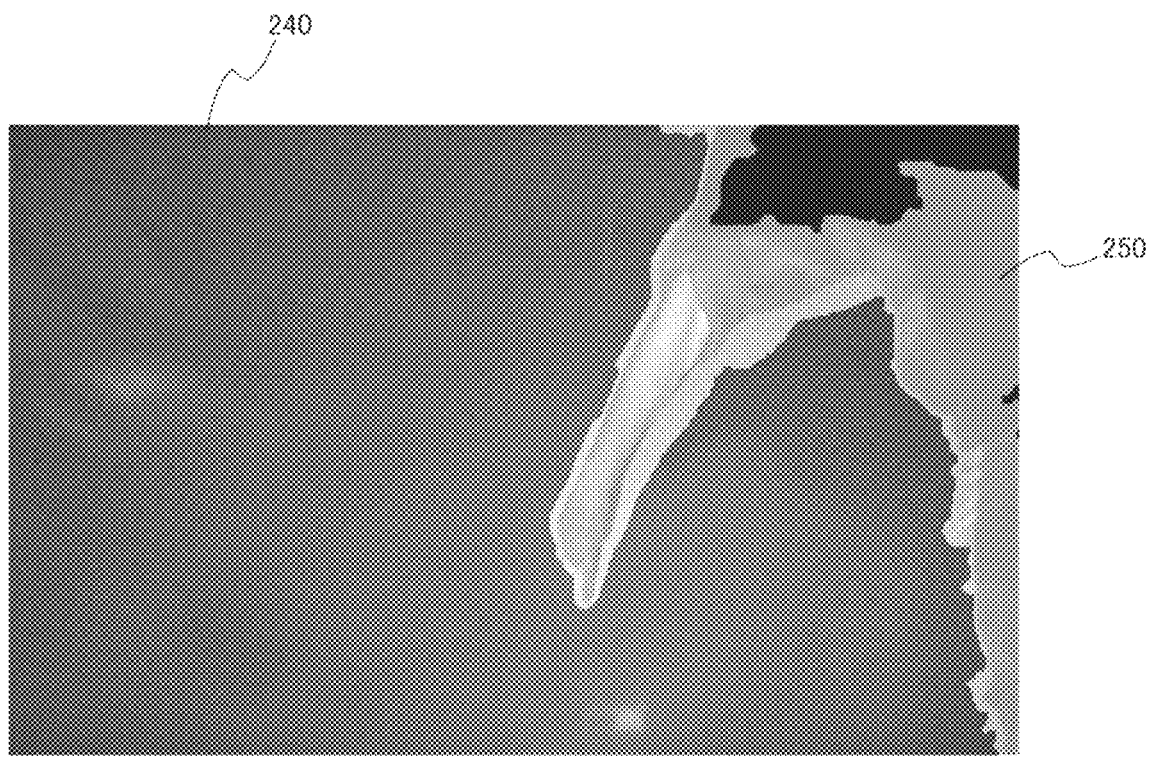
FIG. 15 is a diagram showing a change area.

FIG. 15 is a diagram showing the change area 250.

When the tip detection section 167 has removed the positive area 245 and the negative area 247 existing alone from the difference image 240, the tip detection section 167 identifies the change area 250 included in the difference image 240. The change area 250 is an area in which the image of the pointing element 80 is included. The tip detection section 167 identifies the change area 250 based on the boundary area 220 and the adjacency area.

For example, when the boundary area 220 is a closed area, it is possible for the tip detection section 167 to set the inside of the boundary area 220 as the change area 250. Further, when the boundary area 220 is not a closed area, it is possible for the tip detection section 167 to form a closed area with the boundary area 220 and a side constituting the difference image 240, and then set the inside of the area as the change area 250. Further, it is also possible for the tip detection section 167 to set an area including the boundary area 220 and the adjacency area as the change area 250.

Further, the process corresponding to the detection step executed by the tip detection section 167 is a process of detecting a tip position of the finger as the pointing element 80 based on the shape of the pointing element 80. The details of the detection step will be described later with reference to FIG. 26 through FIG. 29.

The determination section 169 executes a process corresponding to the determination step in the present disclosure. The determination section 169 determines whether or not the pointing element 80 has had contact with the operation surface 13 based on the detection result of the tip detection section 167, and determines the contact position as the pointing position when it has been determined that the pointing element 80 has had contact therewith. The determination section 169 is provided with a learned neural network, and determines the position of the fingertip and whether or not the fingertip has contact with the operation surface 13 based on the neural network. The process executed by the determination section 169 includes processes corresponding to the step S12 and the step S13 shown in FIG. 16.

The control section 170 is a computer device provided with a second storage section 175 and a processor 180. The second storage section 175 is provided with a volatile storage device such as a RAM (Random Access Memory), and a nonvolatile storage device such as a ROM (Read Only Memory) or a flash memory. The second storage section 175 stores a control program to be executed by the processor 180. In the control program, there is included, for example, firmware.

The processor 180 is an arithmetic processing device formed of a CPU (Central Processing Unit) or an MPU (Micro Processing Unit). The processor 180 executes the control program to control each section of the projector 100. The processor 180 can be formed of a single processor, or can also be formed of a plurality of processors. Further, the processor 180 can also be formed of an SoC integrated with a part or the whole of the second storage section 175 and other circuits. Further, the processor 180 can also be formed of a combination of the CPU for executing a program and a DSP for executing predetermined arithmetic processing. Further, it is also possible to adopt a configuration in which all of the functions of the processor 180 are implemented in the hardware, or it is also possible to configure all of the functions of the processor 75 using a programmable device.

The control section 170 is provided with an imaging control section 181 and an operation execution section 183 as functional blocks. These functional blocks represent the functions realized by the processor 180 executing the command set described in the control program to perform arithmetic operations and control with the blocks for descriptive purposes.

The imaging control section 181 makes the detection light irradiation section 130 perform the irradiation with the detection light, and makes the imaging section 120 perform imaging. The imaging section 120 images a range including the projection surface 10 at a predetermined frame rate to form a taken image. The imaging section 120 outputs the taken image thus formed to the position detection section 150. The imaging control section 181 corresponds to an irradiation control section in the present disclosure.

Information representing the operation position of the pointing element 80 on the operation surface 13 and whether or not the pointing element 80 has had contact with the operation surface 13 is input to the operation execution section 183 from the position detection section 150. The operation execution section 183 detects the operation based on the information input from the position detection section 150, and then executes the process corresponding to the operation thus detected. For example, when an operation of moving the pointing element 80 having contact with the operation surface 13 on the operation surface 13 has been detected, the operation execution section 183 draws an image corresponding to the trajectory of the pointing element 80 thus moving in the projection area 15.

A-3. Overall Processing Flow

Figure 16:
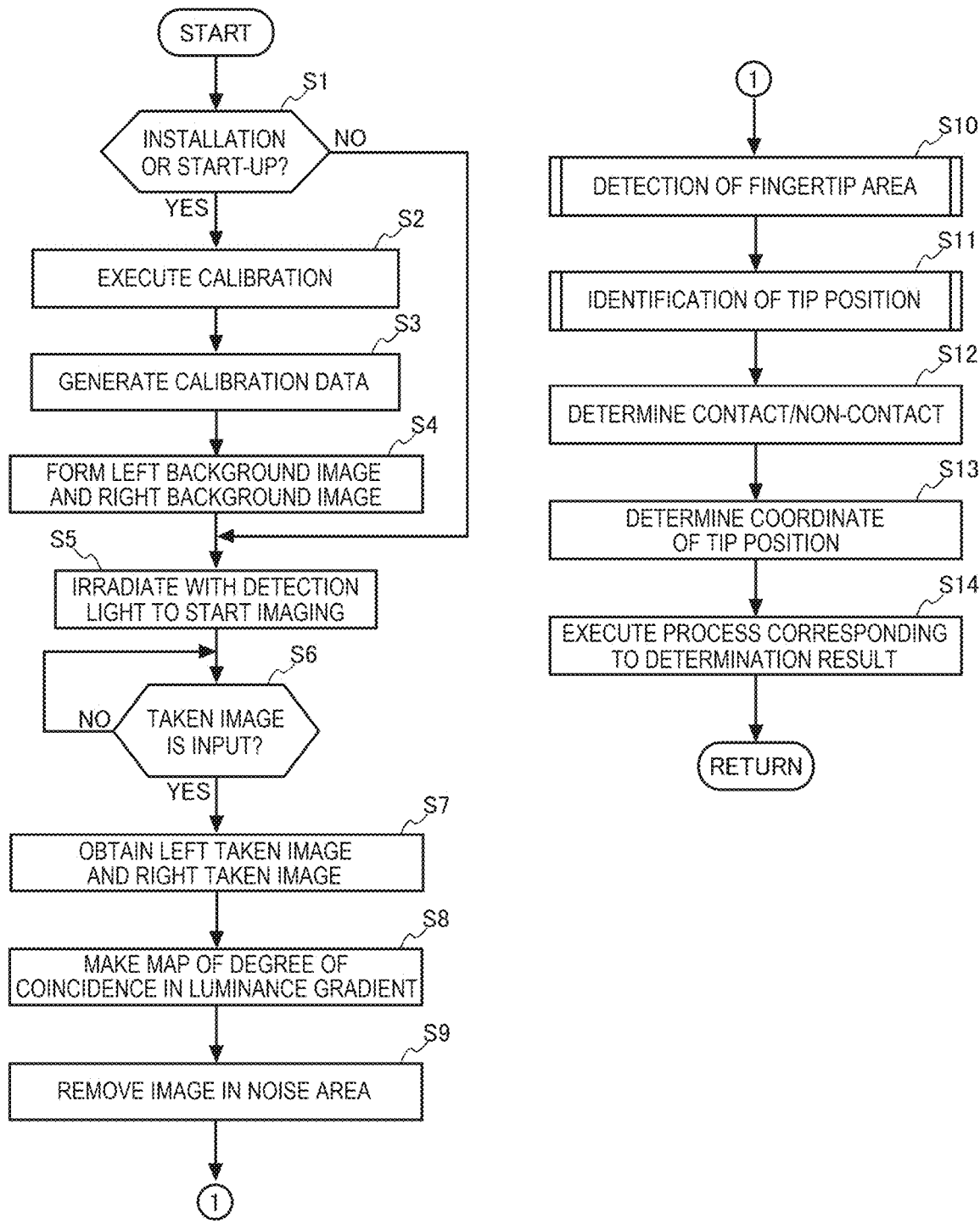
FIG. 16 is a flowchart showing an overall flow.

FIG. 16 is a flowchart representing an operation of the position detection section 150 and the control section 170.

The operation of the position detection section 150 and the control section 170 will be described with reference to the flowchart shown in FIG. 16.

Firstly, the control section 170 determines (step S) whether or not the projector 100 is in an installation process or in a start-up process. For example, it is possible for the control section 170 to determine that the projector 100 is in the installation process when the operation receiving section 135 has received a signal corresponding to a predetermined button provided to the remote controller. Further, it is also possible for the control section 170 to determine that the projector 100 is in the installation process when the projector 100 is powered ON for the first time after the factory shipment of the projector 100. When the projector 100 is not in the installation process nor in the start-up process (NO in the step S), the control section 170 makes the transition to the process in the step S5.

Further, when the projector 100 is in the installation process or the start-up process (YES in the step S1), the control section 170 makes the position detection section 150 execute (step S2) a calibration. The control section 170 makes the projection section 110 project the calibration image 201, and makes the imaging section 120 perform imaging. The position detection section 150 generates (step S3) the calibration data based on the left taken image and the right taken image taken by the imaging section 120. The calibration data thus generated is stored in the first storage section 151.

Further, the control section 170 makes the detection light irradiation section 130 perform irradiation with the infrared light, and makes the first camera 121 and the second camera 123 perform imaging to form (step S4) the image obtained by imaging the projection surface 10 on which the operation by the pointing element 80 has not been started. On this occasion, the taken images formed by the first camera 121 and the second camera 123 are stored in the first storage section 151 of the position detection section 150 as the left background image 215 and the right background image 217.

Then, when the operation of the user is received by the operation receiving section 135, the control section 170 starts (step S5) the detection of the operation by the pointing element 80. The control section 170 makes the detection light irradiation section 130 perform the irradiation with the infrared light, and makes the first camera 121 and the second camera 123 perform imaging. The first camera 121 and the second camera 123 start imaging in accordance with an instruction from the control section 170, and then outputs the taken images thus formed to the position detection section 150. The step S5 corresponds to an irradiation step in the present disclosure.

The position detection section 150 determines (step S6) whether or not the left taken image 211 and the right taken image 213 have been input from the imaging section 120. When no input of the left taken image 211 and the right taken image 213 exists (NO in the step S6), the position detection section 150 waits until the left taken image 211 and the right taken image 213 are input. Further, when the left taken image 211 and the right taken image 213 have been input (YES in the step S6), the position detection section 150 temporarily stores the left taken image 211 and the right taken image 213 thus input in the first storage section 151.

Then, the position detection section 150 retrieves to thereby obtain the left taken image 211 and the right taken image 213 from the first storage section 151. Further, the position detection section 150 retrieves the right background image 217 and the right taken image 213 from the first storage section 151. The position detection section 150 detects the edges of the left taken image 211, the right taken image 213, the left background image 215, and the right background image 217 using an image filter for edge detection. Then, the position detection section 150 respectively calculates the luminance gradients based on the edges thus detected.

When the position detection section 150 has calculated the luminance gradients, the position detection section 150 makes (step S8) the map representing the degree of coincidence in the luminance gradient based on the luminance gradients thus calculated. The position detection section 150 makes the first luminance gradient map 221, the second luminance gradient map 223, and the third luminance gradient map 225 as maps representing the degree of coincidence in the luminance gradient.

Then, the position detection section 150 determines that the area which is the same or substantially the same among the first luminance gradient map 221, the second luminance gradient map 223, and the third gradient map 225, and is displayed as while is the noise area. The position detection section 150 removes (step S9) the image in the noise area thus determined in the left taken image 211 and the right taken image 213.

Then, the position detection section 150 converts the left taken image 211 and the right taken image 213 with the image in the noise area removed into the left rectangular image 235 and the right rectangular image 237 using the calibration data. The position detection section 150 forms the difference image 240 by subtracting the right rectangular image 237 from the left rectangular image 235 thus converted. The position detection section 150 extracts the change area 250 corresponding to the pointing element 80 from the difference image 240 thus formed to detect (step S10) the fingertip area 270. Then, the position detection section 150 identifies (step S1l) the tip position 275 of the finger as the pointing element 80 from the fingertip area 270 thus detected. The details of the step S10 will be described with reference to the flowchart shown in FIG. 19. Further, the details of the step S11 will be described with reference to the flowchart shown in FIG. 26.

When the position detection section 150 has identified the tip position 275 of the pointing element 80, the position detection section 150 determines (step S12) whether or not the pointing element 80 and the operation surface 13 have contact with each other based on the tip position 275 thus identified. Further, the position detection section 150 determines (step S13) the coordinate in the operation surface 13 of the tip position 275. The position detection section 150 outputs the determination result on whether or not the pointing element 80 and the operation surface 13 have contact with each other and the coordinate in the operation surface 13 of the tip position 275 to the control section 170.

The control section 170 executes (step S14) the process based on the determination result on whether or not the pointing element 80 and the operation surface 13 have contact with each other and the coordinate in the operation surface 13.

For example, when the information representing the contact is continuously input from the position detection section 150, the control section 170 generates the trajectory data representing the trajectory of the motion of the pointing element 80 based on the coordinate in the operation surface 13, and then projects an image of a figure or the like corresponding to the trajectory data thus generated on the projection area 15 to thereby display the image. Further, when the information representing the contact is input, the control section 170 determines whether or not an icon is displayed at the coordinate in the operation surface 13 thus input. When the icon is displayed at the coordinate in the operation surface 13 thus input, the control section 170 associates the operation associated with this icon with the operation of the pointing element 80. For example, when the icon denotes a pen, the control section 170 generates the trajectory data representing the trajectory of the position where the tip of the pointing element 80 has contact with the operation surface 13, and projects an image of a figure or the like corresponding to the trajectory data thus generated on the projection area 15 to thereby display the image. Further, when the icon denotes an eraser, display of the image of a figure or the like displayed at the position in the operation surface 13 corresponding to the coordinate in the operation surface 13 thus input is erased.

A-4. Stereo Calibration

Then, the calibration will be described with reference to FIG. 17 and FIG. 18.

Figure 17:
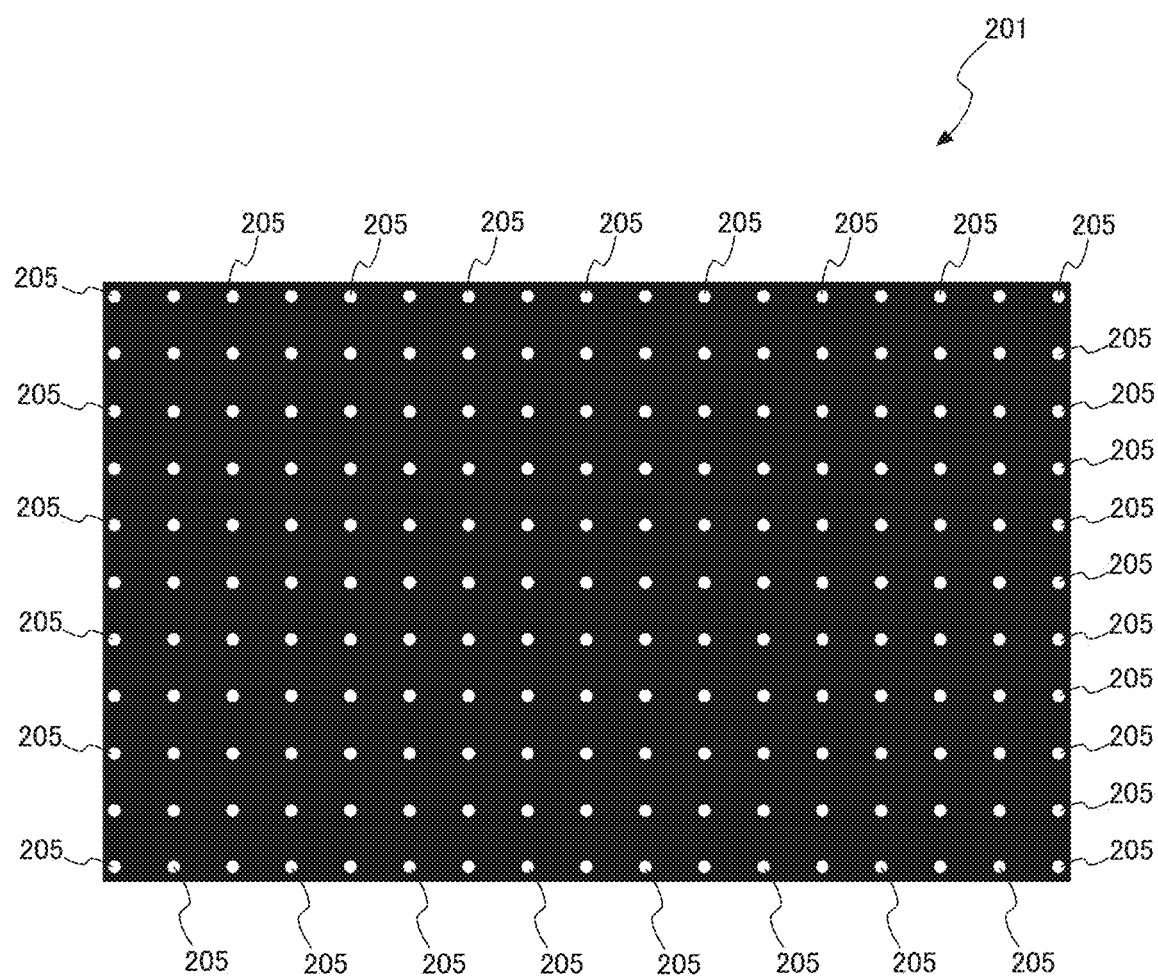
FIG. 17 is a diagram showing an example of a calibration image.

FIG. 17 is a diagram showing an example of the calibration image 201.

Firstly, due to the control by the control section 170, the projection section 110 is made to project the calibration image 201 shown in FIG. 17, and the first camera 121 and the second camera 123 are made to image the projection surface 10 on which the calibration image 201 is projected.

As shown in FIG. 17, the calibration image 201 is an image in which marks 205 each having a predetermined shape are arranged in the vertical direction and the horizontal direction of the calibration image 201 at regular intervals. In the present embodiment, as the calibration image 201, there is used an image in which white dots as the marks 205 are arranged in the vertical direction and the horizontal direction of the calibration image 201 at regular intervals on a black background.

The calibration data generation section 161 obtains the left taken image 211 obtained by imaging the projection surface 10 on which the calibration image 201 is projected with the first camera 121, and the right taken image 213 obtained by imaging the projection surface 10 with the second camera 123.

The calibration data generation section 161 refers to the first range information to extract the area of the left taken image 211 corresponding to the projection area 15. Similarly, the calibration data generation section 161 refers to the second range information to extract the area of the right taken image 213 corresponding to the projection area 15. The area of the left taken image 211 corresponding to the projection area 15 thus extracted is referred to as a left extracted image 231, and the area of the right taken image 213 corresponding to the projection area 15 thus extracted is referred to as a right extracted image 233.

Figure 18:
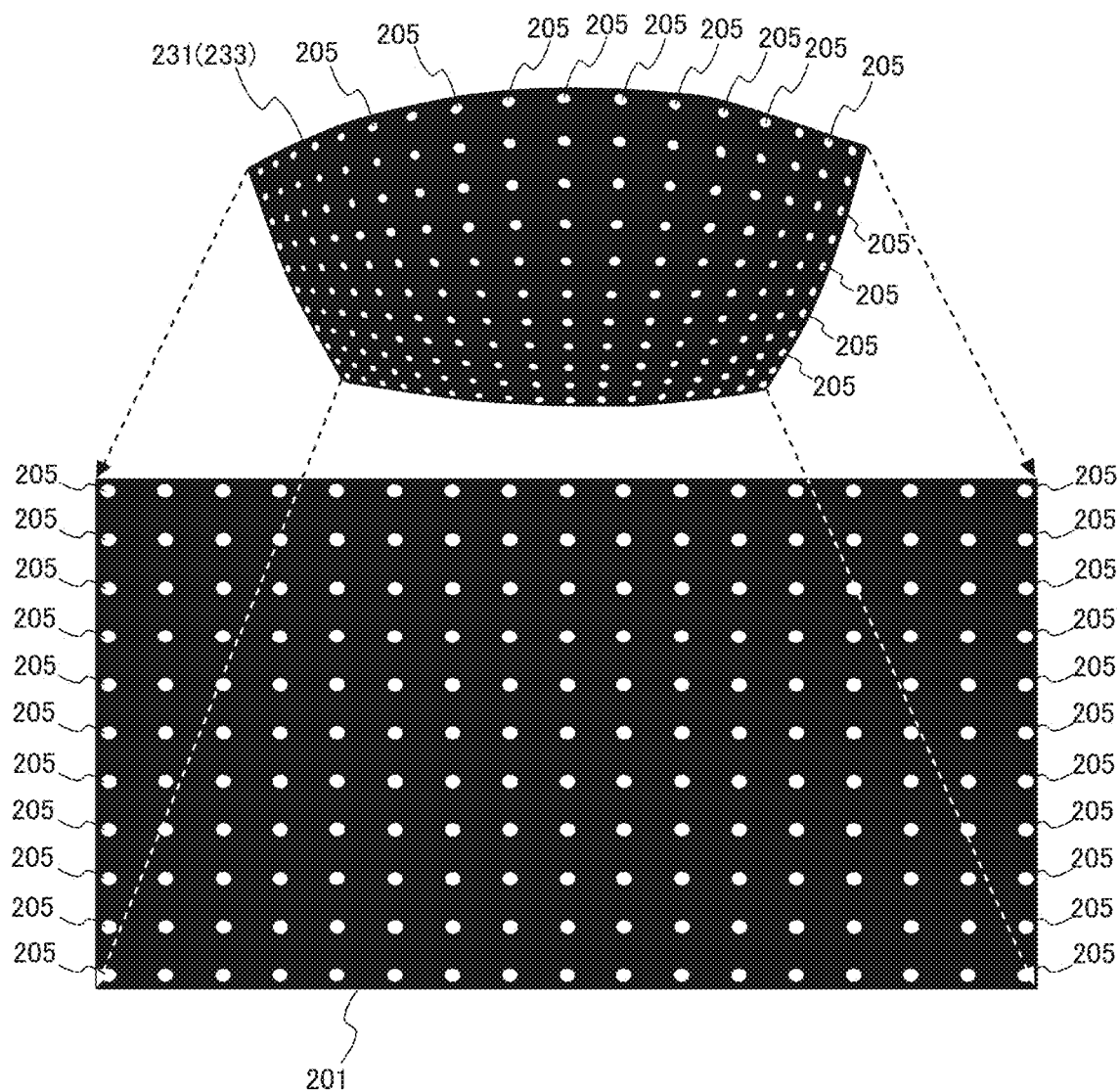
FIG. 18 is an explanatory diagram for explaining a conversion method of converting a left extracted image and a right extracted image into a rectangular shape.

FIG. 18 is a diagram showing a deformation method of deforming the shapes of the left extracted image 231 and the right extracted image 233 into rectangular shapes.

In an upper part of FIG. 18, there is shown the left extracted image 231 and the right extracted image 233. Due to the relationship between the first camera 121 and the projection surface 10 and the relationship between the second camera 123 and the projection surface 10, the left taken image 211 and the right taken image 213 each become a rectangular image. Further, the left extracted image 231 and the right extracted image 233 each become an image in which the marks 205 are shifted in the relationship with the first camera 121 and the second camera 123.

The calibration data generation section 161 compares the calibration image 201 stored in the first storage section 151 with the left extracted image 231 and the right extracted image 233 to decide the first image conversion coefficient and the second image conversion coefficient. Specifically, since the left extracted image 231 and the right extracted image 233 are the same in the deformation method as each other, the deformation method for the left extracted image 231 will hereinafter be described.

The calibration data generation section 161 compares the positions of the marks 205 in the calibration image 201 with the positions of the marks in the left extracted image 231, and compares the vertexes of the calibration image 201 with the vertexes of the left extracted image 231. The calibration data generation section 161 decides a stretching direction and a stretching amount as deformation amounts for deforming the left extracted image 231 into the same rectangular shape as that of the calibration image 201 as the first image conversion coefficient based on these comparison results. Similarly, the calibration data generation section 161 compares the positions of the marks 205 in the calibration image 201 with the positions of the marks in the right extracted image 233, and compares the vertexes of the calibration image 201 with the vertexes of the right extracted image 233. The calibration data generation section 161 decides a stretching direction and a stretching amount as deformation amounts for deforming the right extracted image 233 into the same rectangular shape as that of the calibration image 201 as the second image conversion coefficient based on these comparison results.

The first image conversion coefficient is a coefficient for converting the shape of the left extracted image 231 so that the positions of the marks 205 of the left extracted image 231 coincide with the positions of the marks 205 formed in the calibration image 201. Further, the second image conversion coefficient is a coefficient for converting the shape of the right extracted image 233 so that the positions of the marks 205 of the right extracted image 233 coincide with the positions of the marks 205 formed in the calibration image 201. Therefore, the left extracted image 231 converted using the first image conversion coefficient and the right extracted image 233 converted using the second image conversion coefficient coincide with the calibration image 201. Therefore, the left extracted image 231 and the right extracted image 233 are converted so that the disparity on the projection surface 10 becomes 0. The left extracted image 231 and the right extracted image 233 converted so that the disparity on the projection surface 10 becomes 0 correspond to the first taken image and the second taken image calibrated with respect to the operation surface in the present disclosure. Further, the calibration can be said to be a stereo calibration for making the coordinate system of the first camera 121 and the coordinate system of the second camera 123 correspond to the coordinate system of the projection surface 10.

A-5. Detection of Fingertip Area

Figure 19:
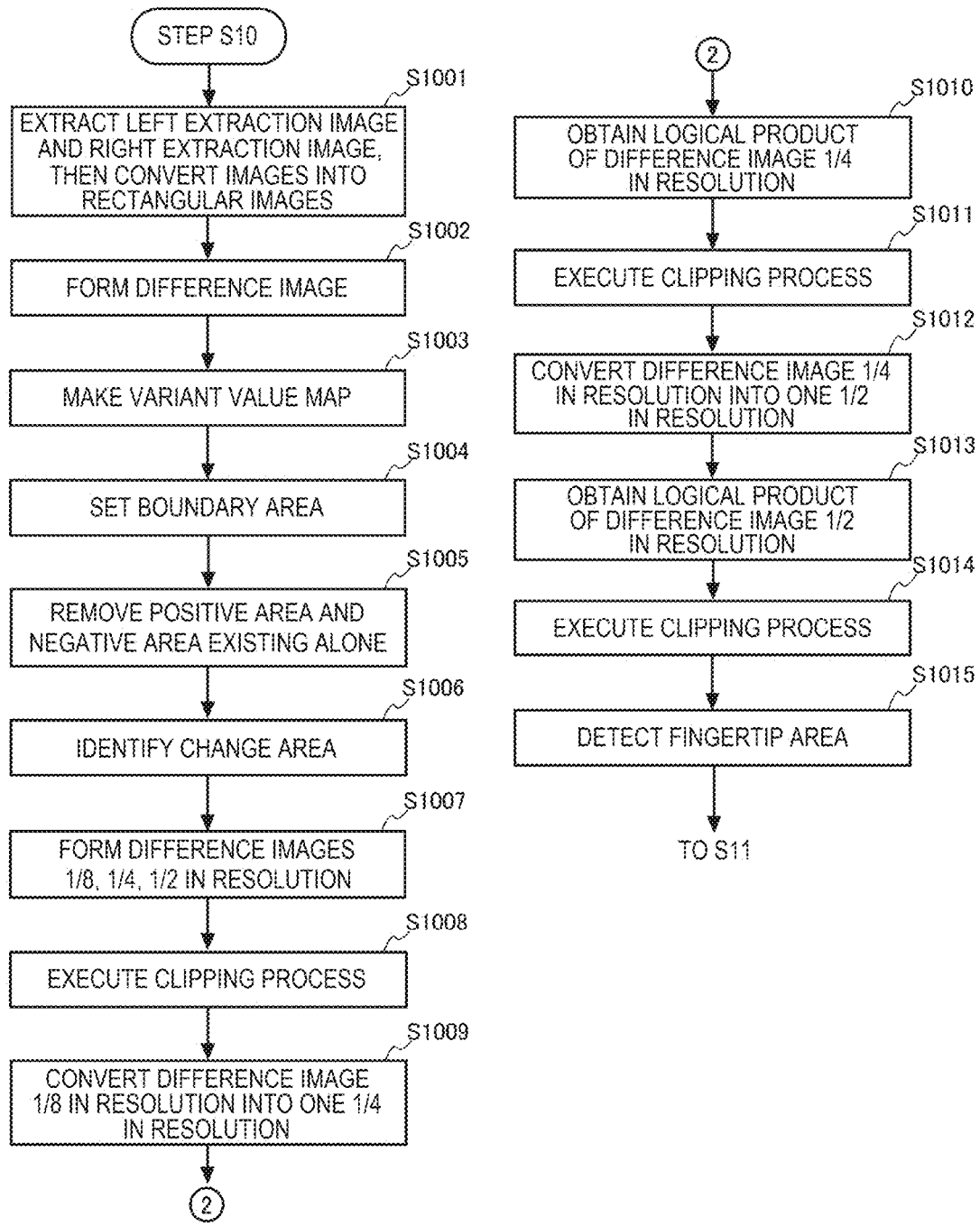
FIG. 19 is a flowchart showing a process of detecting a fingertip area.

FIG. 19 is a flowchart showing a detection process for the fingertip area 270 in the step S10 shown in FIG. 16.

Detection of the fingertip area 270 is a process of detecting the fingertip area 270 as an area including the tip of the pointing element 80 having contact with or having approached the operation surface 13 from the whole of the taken image of the operation surface 13.

The details of the detection process for the fingertip area 270 will be described with reference to the flowchart shown in FIG. 19.

Firstly, the position detection section 150 extracts the left extracted image 231 from the left taken image 211 with the image of the noise area removed using the calibration data, and then deforms the shape of the left extracted image 231 thus extracted into a rectangular shape to form (step S1001) the left rectangular image 235. Similarly, the position detection section 150 extracts the right extracted image 233 from the right taken image 213 with the image of the noise area removed using the calibration data, and then deforms the shape of the right extracted image 233 into a rectangular shape to form (step S1001) the right rectangular image 237.

Then, the position detection section 150 forms (step S1002) the difference image 240. The position detection section 150 forms the difference image 240 by subtracting the right rectangular image 237 from the left rectangular image 235.

The difference image 240 includes the change area 250. The change area 250 is an area in which the disparity amount between the left rectangular image 235 and the right rectangular image 237 is within a predetermined range. The difference image 240 is an image obtained by subtracting the right rectangular image 237 from the left rectangular image 235. Therefore, the object which is located at the position where Z=0 is true as the position of the projection surface 10, and the disparity of which becomes 0 is not displayed in the difference image 240. Further, the more distant from the projection surface 10 the position where the object exists is, the larger the disparity becomes, and the larger the difference between the position of the object in the left rectangular image 235 and the position of the object in the right rectangular image 237 becomes. In the difference image 240 shown in FIG. 12, the change area 250 corresponds to an area where the finger as the pointing element 80, the hand, the arm, and so on are imaged. Further, in the difference image 240 shown in FIG. 12, there is detected an isolated area of the positive area 245 and the negative area 247 as a noise of the reflected light or a noise caused by reflection of the outside light on the projection surface 10 due to the condition of the projection surface 10 and so on.

Then, the position detection section 150 makes (step S1003) the variance value map of the difference image 240 thus formed. The position detection section 150 calculates the variance value of the pixel values of the pixels constituting the difference image 240 to make the variance value map.

Then, the position detection section 150 separates the difference image 240 into the foreground area and the background area based on the variance value map thus made. The position detection section 150 determines that the area no lower in variance value than the threshold value is the foreground area, and determines that the area lower in variance value than the threshold value is the background area. Subsequently, the position detection section 150 sets (step S1004) a predetermined area including the boundary line between the foreground area and the background area as the boundary area 220.

Then, the position detection section 150 removes (step S1005) an image of the area where only the positive area 245 exists alone and an image of the area where only the negative area 247 exists alone in the difference image 240.

Then, the position detection section 150 identifies (step S1006) the change area 250 included in the difference image 240. The tip detection section 167 identifies the area of the difference image 240 surrounded by the boundary area 220, or the area of the difference image 240 surrounded by the boundary area 220 and the side of the difference image 240 as the change area 250.

Then, the position detection section 150 converts the resolution of the difference image 240 to form (step S1007) a third difference image 240C ⅛ in resolution, a second difference image 240B ¼ in resolution, and a first difference image 240A ½ in resolution.

Figure 20:
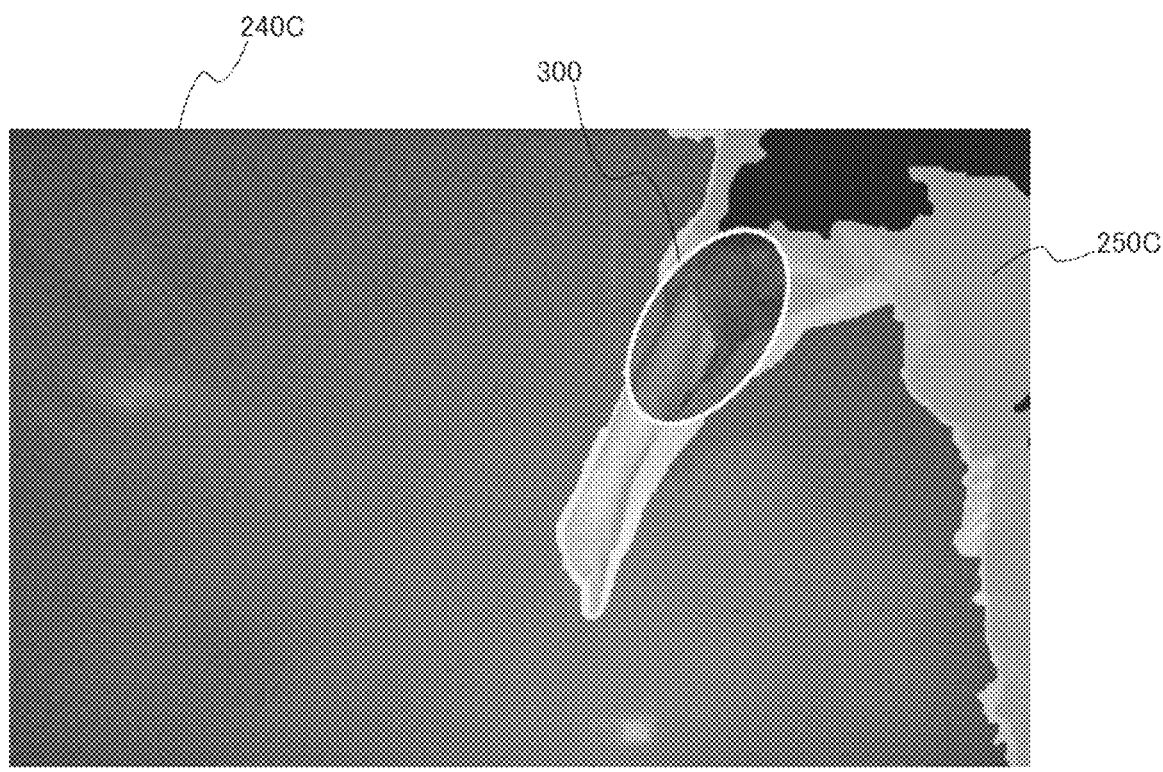
FIG. 20 is a diagram showing a state in which a figure is superimposed on the change area.

FIG. 20 is a diagram showing the state in which a figure 300 is superimposed on a third change area 250C.

Figure 21:
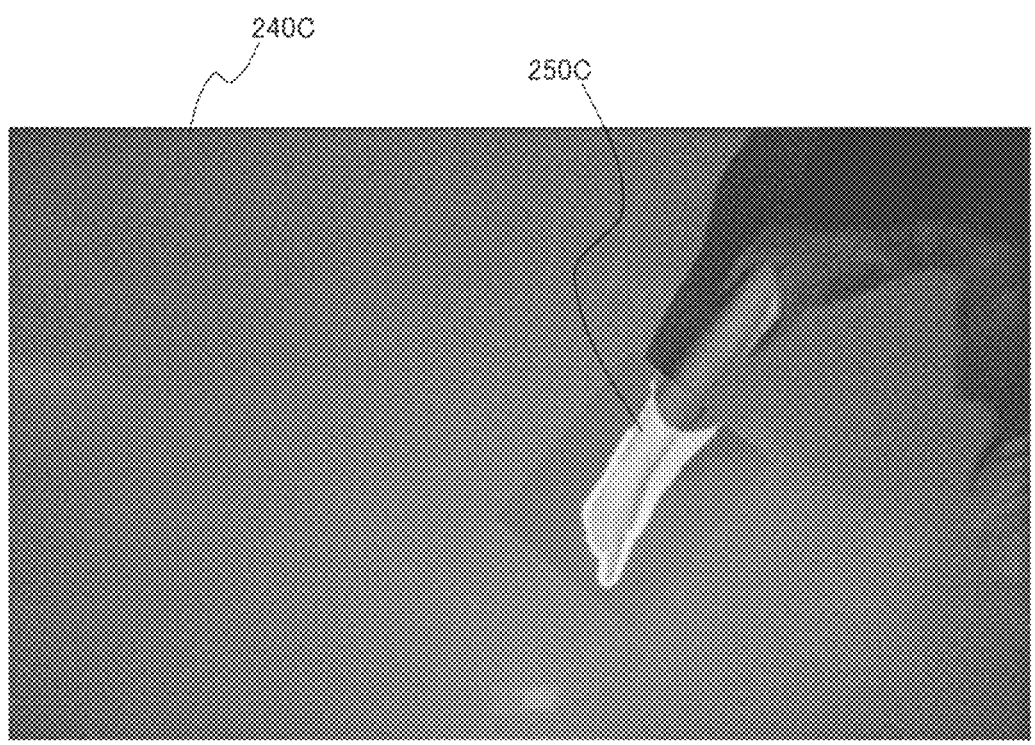
FIG. 21 is a diagram showing a state in which an image in the change area having contact with an outer periphery of the difference image is removed.

Then, the position detection section 150 executes (step S1008) a clipping process. The position detection section 150 detects the third change area 250C which the figure 300 having a predetermined size completely fits into while moving the figure 300 on the third difference image 240C ⅛ in resolution. When the tip detection section 167 has detected the third change area 250C which the figure 300 fits into, the tip detection section 167 deletes the image in the third change area 250C on which the figure 300 is superimposed. FIG. 20 shows the state in which the image in the third change area 250C superimposed on the figure 300 is deleted. The position detection section 150 repeats this process until the third change area 250C which the figure 300 fits into no longer exists. Then, the position detection section 150 removes an area having contact with an outer periphery of the third difference image 240C out of the third change area 250C. FIG. 21 is a diagram showing a state in which an image in the third change area 250C having contact with the outer periphery of the third difference image 240C is removed.

Then, the position detection section 150 converts (step S1009) the third difference image 240C ⅛ in resolution into one ¼ in resolution. Then, the position detection section 150 calculates (step S1010) a logical product of the third difference image 240C having been converted into one ¼ in resolution and the second difference image 240B ¼ in resolution. Thus, there is formed the second difference image 240B which is the second difference image 240B ¼ in resolution, and from which the image removed in the third change area 250C ⅛ in resolution is removed.

Figure 22:
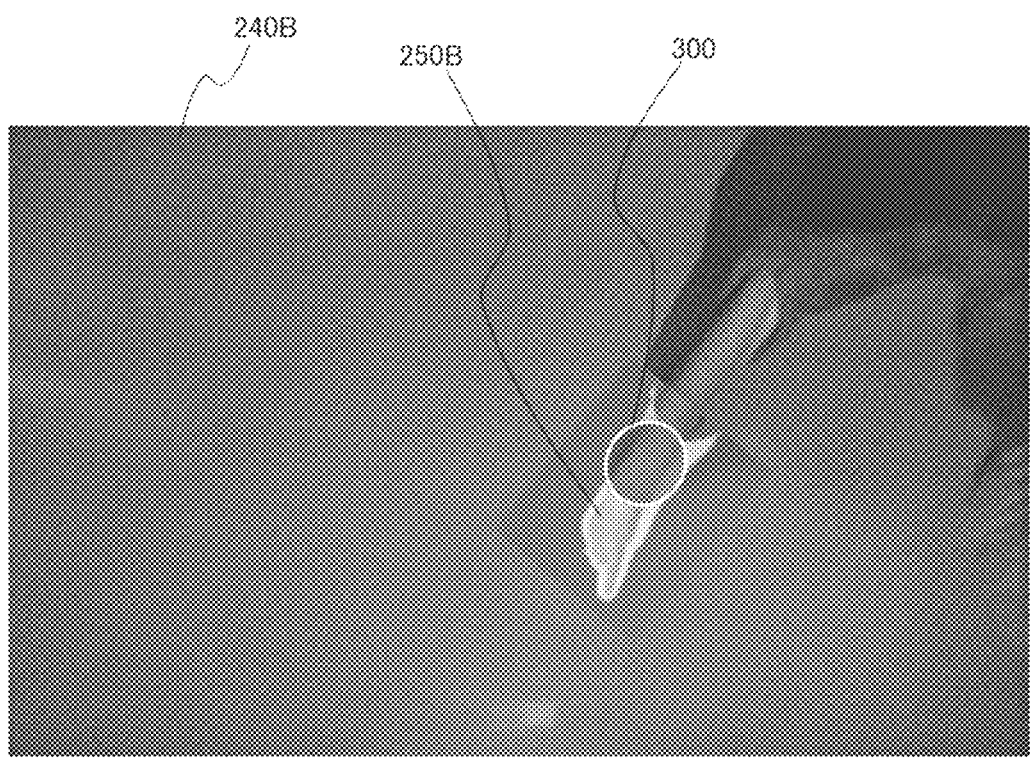
FIG. 22 is a diagram showing a state in which a figure is superimposed on the change area.

FIG. 22 is a diagram showing the second difference image 240B, and shows a state in which the figure 300 is superimposed on the second change area 250B.

Figure 23:
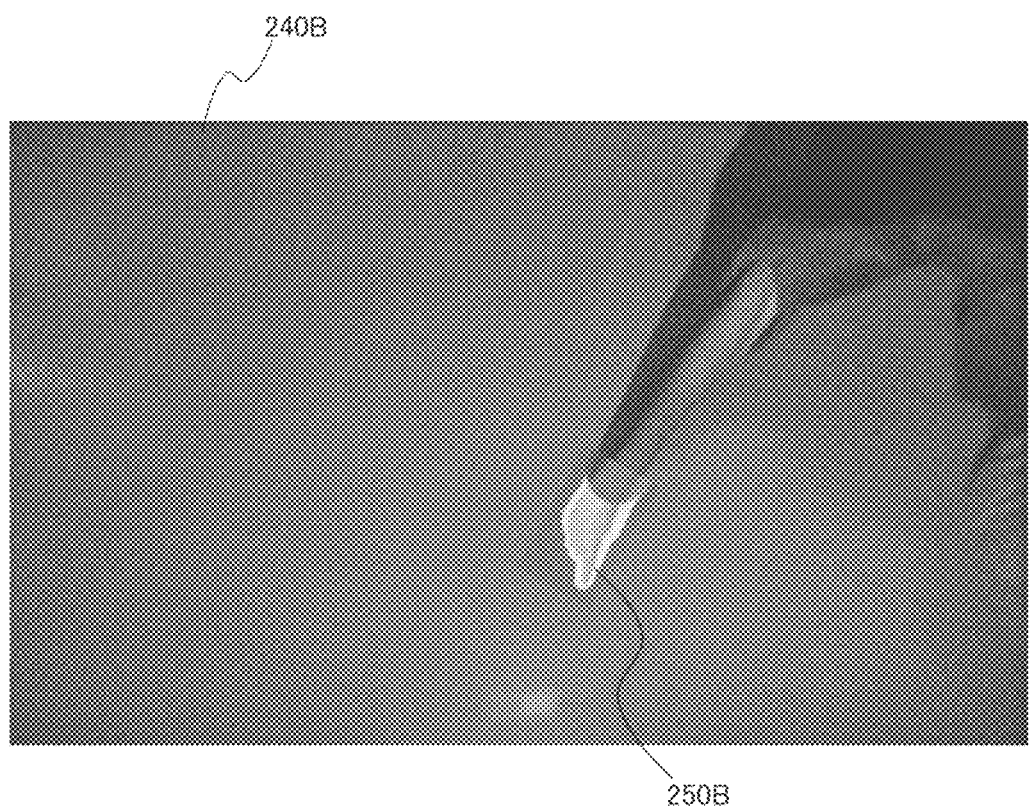
FIG. 23 is a diagram showing a state in which an image in the change area having contact with an outer periphery of the difference image is removed.

The position detection section 150 executes (step S1011) the clipping process. The position detection section 150 detects the second change area 250B which the figure 300 completely fits into while moving the figure 300 on the second difference image 240B ¼ in resolution. The size of the figure 300 is the same as the size of the figure 300 used for the removal of the image in the third difference image 240C ⅛ in resolution. When the tip detection section 167 has detected the second change area 250B which the figure 300 fits into, the tip detection section 167 deletes the image in the second change area 250B on which the figure 300 is superimposed. The position detection section 150 repeats this process until the second change area 250B which the figure 300 fits into no longer exists. Then, the position detection section 150 removes an area having contact with an outer periphery of the second difference image 240B out of the second change area 250B. FIG. 23 shows a state in which an image in the second change area 250B having contact with the outer periphery of the second difference image 240B is removed.

Then, the position detection section 150 converts (step S1012) the second difference image 240B ¼ in resolution into one ½ in resolution. Then, the position detection section 150 calculates (step S1013) a logical product of the second difference image 240B having been converted into one ½ in resolution and the first difference image 240A ½ in resolution. Thus, there is formed the first difference image 240A which is the first difference image 240A ½ in resolution, and from which the image removed in the third change area 250C ⅛ in resolution and the image removed in the second change area 250B ¼ in resolution are removed.

Figure 24:
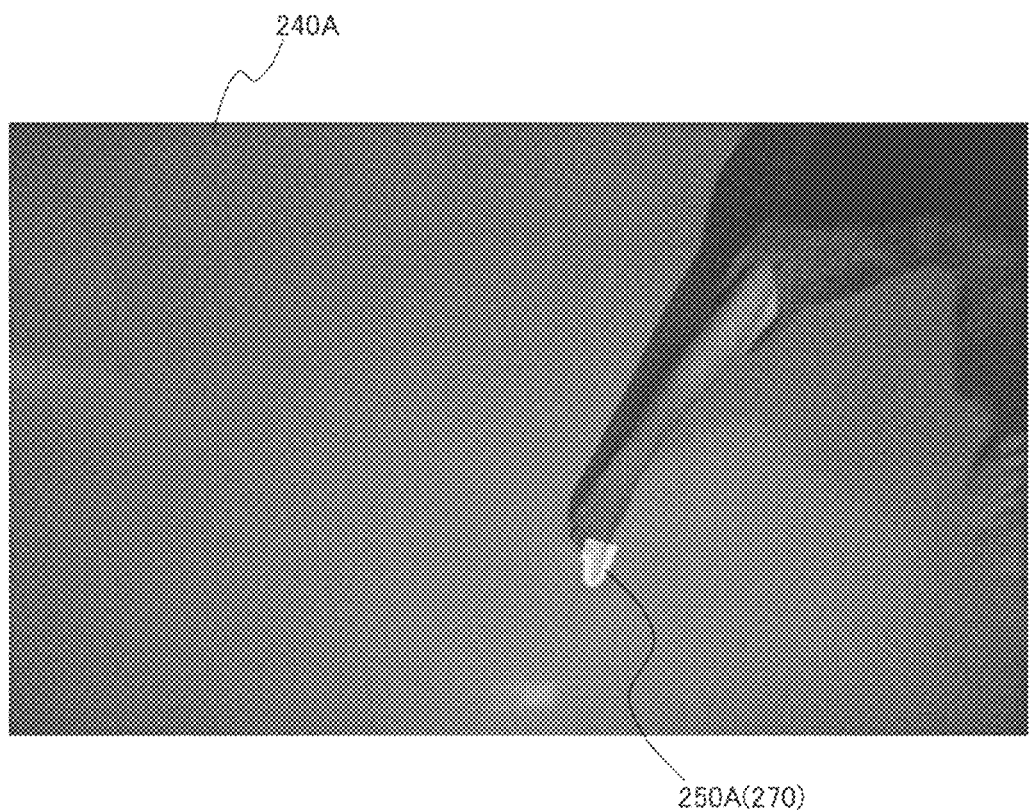
FIG. 24 is a diagram showing a first difference image.

FIG. 24 is a diagram showing the first difference image 240A.

Figure 25:
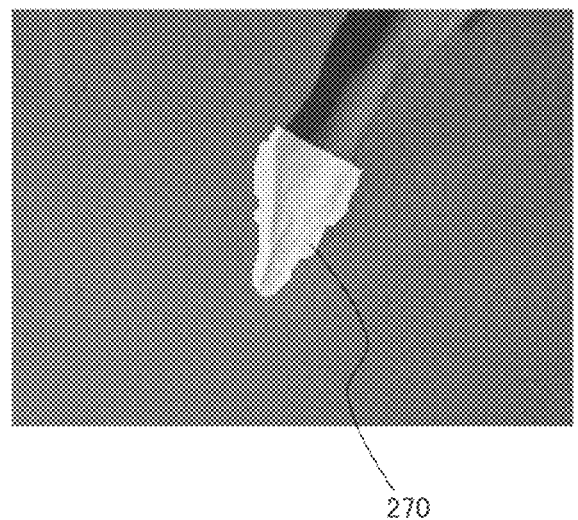
FIG. 25 is a diagram obtained by clipping a specific area centered on the fingertip area from the difference image.

The position detection section 150 executes (step S1014) the clipping process. The position detection section 150 detects the first change area 250A which the figure 300 having a predetermined size completely fits into while moving the figure 300 on the first difference image 240A ½ in resolution. The size of the figure 300 is the same as the size of the figure 300 used for the removal of the image in the third difference image 240C ⅛ in resolution and the second difference image 240B ¼ in resolution. When the position detection section 150 has detected the first change area 250A which the figure 300 fits into, the position detection section 150 deletes the image in the first change area 250A on which the figure 300 is superimposed. The position detection section 150 repeats this process until the first change area 250A which the figure 300 fits into no longer exists. The position detection section 150 detects (step S1015) the first change area 250A remaining unremoved as the fingertip area 270. FIG. 25 is a diagram obtained by clipping a specific area centered on the fingertip area 270 from the difference image 240. Thus, it is possible to detect the fingertip area 270 as an area including the tip of the pointing element 80 having contact with or having approached the operation surface 13 from the whole of the taken image of the operation surface 13 without false detection due to an influence of a noise or the like.

A-6. Identification of Tip Position

Figure 26:
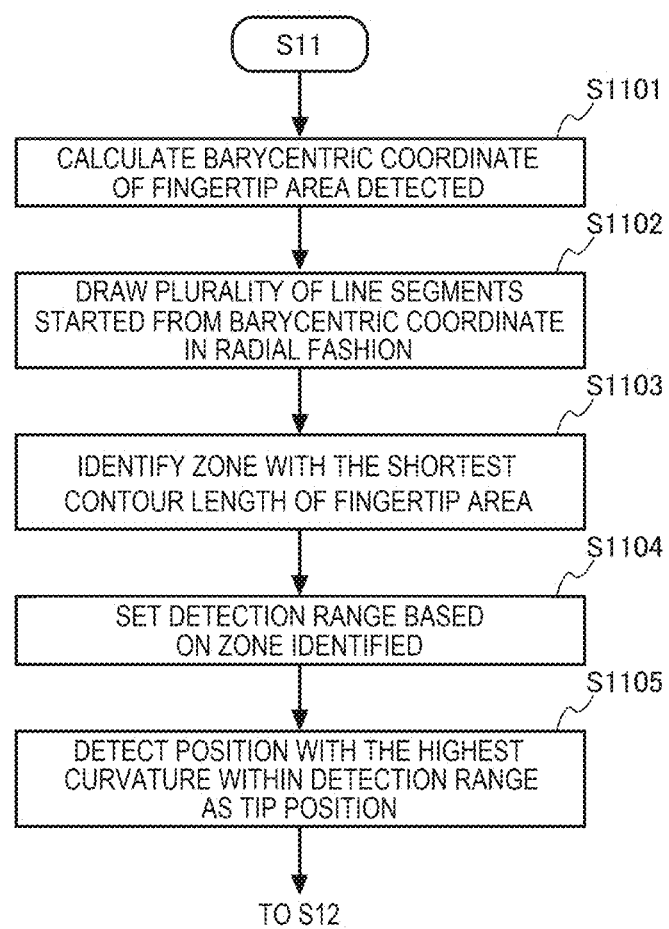
FIG. 26 is a flowchart showing details of a process of identifying a tip position of a finger.

FIG. 26 is a flowchart showing the details of a process of identifying the tip position of the finger in the step S11 shown in FIG. 16. The identification of the tip position of the finger is a process of calculating the tip position 275 of the fingertip area 270 shown in FIG. 24 based on the fingertip area 270 detected in the step S10, and then clipping an area corresponding to the tip position 275 from each of the left taken image 211 and the right taken image 213.

Figure 27:
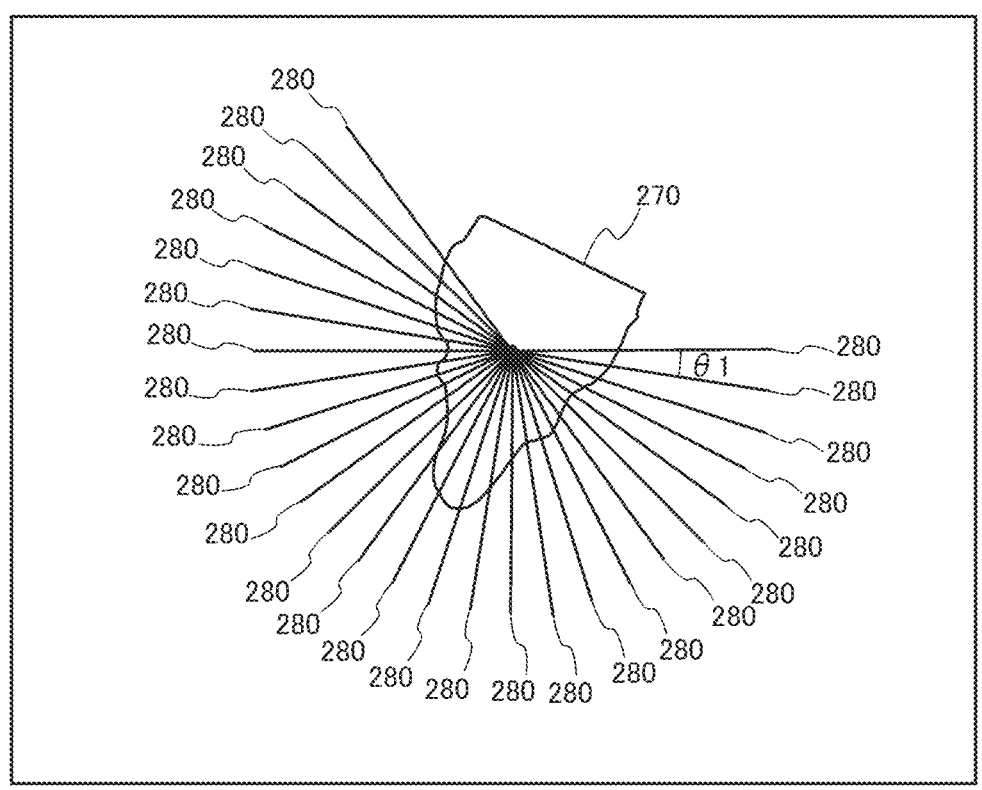
FIG. 27 is a diagram showing line segments drawn in a radial fashion.

The process of identifying the tip position of the finger will be described with reference to the flowchart shown in FIG. 26. FIG. 27 is a diagram obtained by showing the fingertip area 270 corresponding to FIG. 24, and drawing radial line segments 280.

Firstly, the position detection section 150 calculates (step S1101) a barycentric coordinate of the fingertip area 270 detected. When the position detection section 150 has calculated the barycentric coordinate of the fingertip area 270, the position detection section 150 draws (step S1102) a plurality of line segments 280 on the first difference image 240A setting the barycentric coordinate of the fingertip area 270 thus calculated as the starting point in a radial fashion centering around the barycentric coordinate. On this occasion, the position detection section 150 draws the plurality of line segments 280 so that the angle 81 formed between the line segments 280 adjacent to each other becomes constant as shown in FIG. 27.

Figure 28:
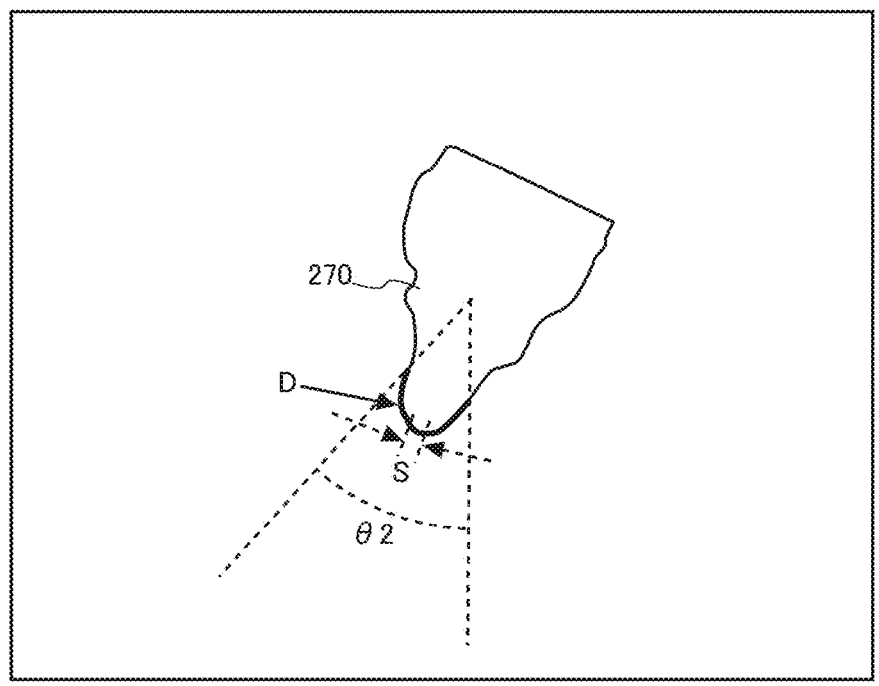
FIG. 28 is a diagram showing a zone in which the length of the contour line is the shortest and a detection range.

FIG. 28 is a diagram showing a zone S in which the length of the contour line is the shortest and a detection range D.

The position detection section 150 calculates the length of the contour line in each of the zones obtained by separating the fingertip area 270 with two line segments 280 adjacent to each other to identify (step S1103) the zone in which the length of the contour line thus calculated is the shortest. It is assumed that the zone S shown in FIG. 20 is the zone in which the length of the contour line is the shortest.

Then, the position detection section 150 sets (step S1104) the detection range D based on the zone S thus identified. For example, the range of the contour line corresponding to the angle θ2 shown in FIG. 28 corresponds to the detection range D. The detection range D is a range including the zone S and including the both sides of the contour line separated by the zone S.

Figure 29:
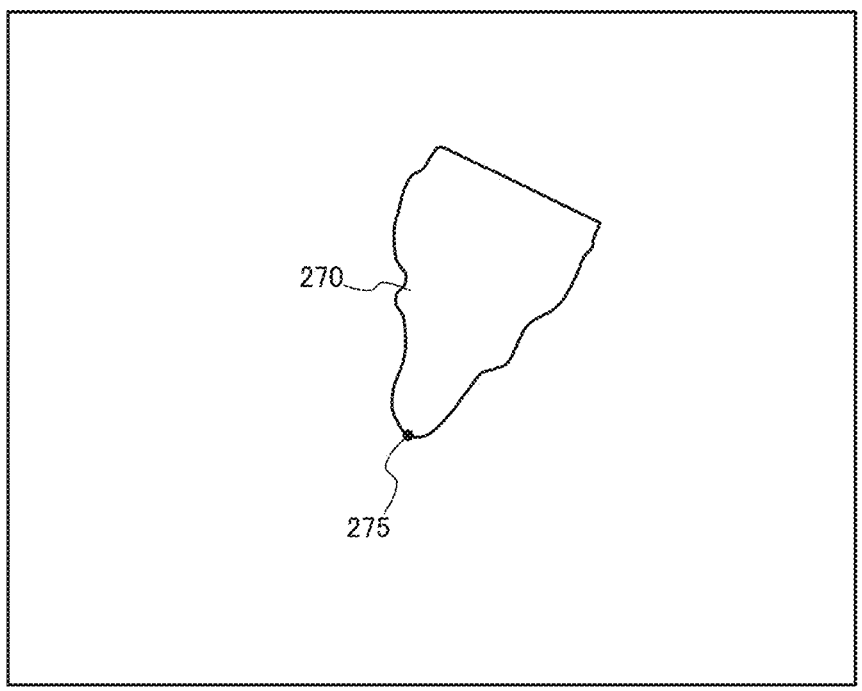
FIG. 29 is a diagram showing a tip position of the fingertip area.

Then, the position detection section 150 detects (step S1105) the position where the curvature of the fingertip area 270 is the highest within the detection range D thus set. The position detection section 150 sets the position where the curvature is the highest thus detected as the tip position 275. FIG. 29 is a diagram showing the tip position 275 in the fingertip area 270. The position detection section 150 clips an image in a predetermined range centered on the tip position 275 from the left rectangular image 235 as the base of the difference image 240 corresponding to the detection of the tip position 275. Further, the position detection section 150 clips an image in a predetermined range centered on the tip position 275 from the right rectangular image 237 as the base of the difference image 240 corresponding to the detection of the tip position 275. The image clipped from the left rectangular image 235 is referred to as a left clipped image 261, and the image clipped from the right rectangular image 237 is referred to as a right clipped image 263. The predetermined range is set in accordance with the size and the shape of the pointing element 80.

FIG. 30 is a diagram showing the left clipped image 261 and the right clipped image 263. The left clipped image 261 corresponds to a first area image in the present disclosure, and the right clipped image 263 corresponds to a second area image in the present disclosure. Thus, the first area image and the second area image which are each an image in a predetermined range including the tip of the pointing element 80 having contact with or having approached the operation surface 13 can respectively be clipped from the left taken image 211 and the right taken image 213 obtained by imaging the whole of the operation surface 13.

A-7. Determination of Contact/Non-Contact and Coordinate of Tip Position

Figure 31:
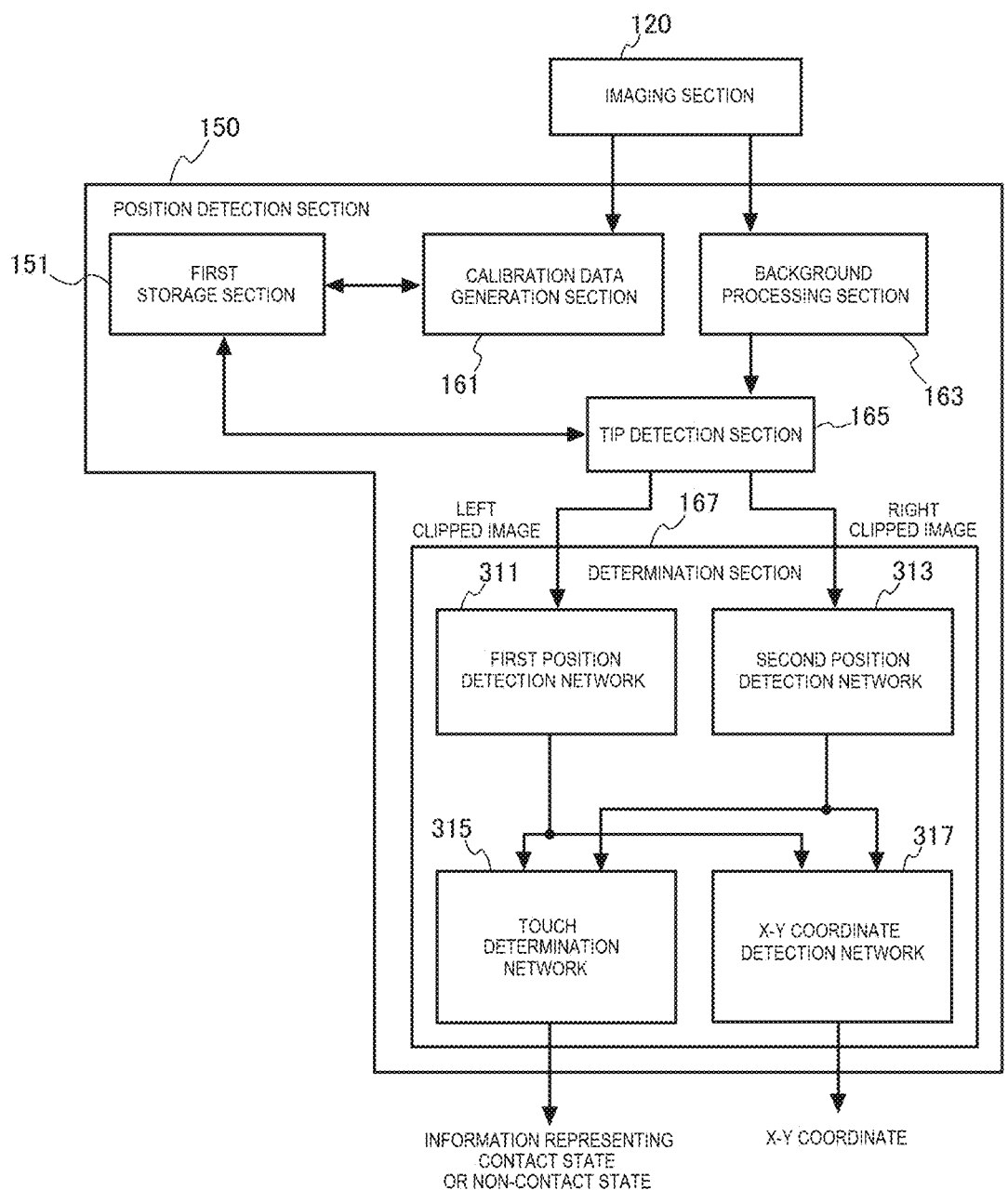
FIG. 31 is a block diagram showing a configuration of a position detection section.

Then, by executing a process using the left clipped image 261 and the right clipped image 263 clipped in the step S7 as input, whether or not the pointing element 80 has contact with the operation surface 13 is determined with high accuracy, and the coordinate of the tip position of the pointing element 80 is detected. FIG. 31 is a diagram showing a detailed configuration of the determination section 169. The determination section 169 executes the processes corresponding to the step S12 and the step S13 shown in FIG. 16. The determination section 169 is provided with a first position detection network 311, a second position detection network 313, a touch determination network 315, and an X-Y coordinate detection network 317.

The first position detection network 311 is an AI (Artificial Intelligence), and is constituted by software constituting the learned neural network, or software and hardware. The first position detection network 311 in the present embodiment is provided with a convolution neural network as the learned neural network. To the first position detection network 311, there is input the left clipped image 261 from the tip detection section 167. The first position detection network 311 inputs the left clipped image 261 to the neural network, and outputs information representing the position of the fingertip in the left clipped image 261, namely the coordinate of the left clipped image 261 representing the position of the fingertip.

The second position detection network 313 is an AI, and is constituted by software constituting the learned neural network, or software and hardware. The second position detection network 313 in the present embodiment is provided with a convolution neural network as the learned neural network. To the second position detection network 313, there is input the right clipped image 263 from the tip detection section 167. The second position detection network 313 inputs the right clipped image 263 to the neural network, and outputs information representing the position of the fingertip in the right clipped image 263, namely the coordinate of the right clipped image 263 representing the position of the fingertip.

The touch determination network 315 is an AI, and is constituted by software constituting the learned neural network, or software and hardware. The touch determination network 315 in the present embodiment is provided with a convolution neural network as the learned neural network. To the touch determination network 315, there is input information representing the position of the fingertip from the first position detection network 311 and the second position detection network 313. The touch determination network 315 inputs the information representing the position of the fingertip to the neural network, and outputs a determination result of the determination on whether or not the fingertip has contact with the operation surface 13. When the touch determination network 315 has determined that the fingertip has contact with the operation surface 13, the touch determination network 315 outputs information representing the contact state, and when the touch determination network 315 has determined that the fingertip does not have contact with the operation surface 13, the touch determination network 315 outputs information representing the non-contact state. The touch determination network 315 outputs the information representing the contact state or the information representing the non-contact state to the control section 170. Thus, the contact of the pointing element 80 to the operation surface 13 is detected at high speed and with high accuracy.

The X-Y coordinate detection network 317 is an AI, and is constituted by software constituting the learned neural network, or software and hardware. The X-Y coordinate detection network 317 in the present embodiment is provided with a convolution neural network as the learned neural network. The convolution neural network corresponds to the learned neural network used for detecting the operation position coordinate. To the X-Y coordinate detection network 317, there is input information representing the position of the fingertip from the first position detection network 311 and the second position detection network 313. The X-Y coordinate detection network 317 inputs the information representing the position of the fingertip to the neural network, and outputs coordinate information representing the position in the operation surface 13 of the fingertip. In other words, the X-Y coordinate detection network 317 outputs the coordinate values representing the coordinate set in advance to the operation surface 13 based on the coordinates of the left clipped image 261 and the right clipped image 263. The X-Y coordinate detection network 317 outputs the coordinate values representing the operation position in the operation surface 13 to the control section 170. Thus, the operation position in the operation surface 13 by the pointing element 80 is detected at high speed and with high accuracy.

Further, to the control section 170, there are input the information representing the contact state or the non-contact state and the coordinate values representing the coordinate in the operation surface 13 from the position detection section 150. The control section 170 executes the process corresponding to the step S14 shown in FIG. 16.

As described hereinabove, the position detection device 200 according to the present embodiment is provided with the control section 170 and the position detection section 150, and detects the position in the operation surface 13 pointed by the pointing element 80. The control section 170 makes the detection light irradiation section 130 perform irradiation with the infrared light in a direction corresponding to the operation surface 13.

The position detection section 150 is provided with the calibration data generation section 161, the background processing section 163, the tip detection section 167, and the determination section 169.

To the position detection section 150, there are input the left taken image 211 taken by the first camera 121 and the right taken image 213 taken by the second camera 123. The left taken image 211 and the right taken image 213 are each an image obtained by imaging the operation surface 13, and are each an image obtained by taking the image formed by the infrared light reflected by the pointing element 80. The first camera 121 and the second camera 123 are different in installation position in the projector 100 from each other, and are different in imaging viewpoint from each other. In other words, the first camera 121 and the second camera 123 constitute a stereo camera.

The tip detection section 167 executes the acquisition step of obtaining the left rectangular image 235 and the right rectangular image 237 calibrated with respect to the operation surface 13.

Specifically, the tip detection section 167 extracts the left extracted image 231 as an area where the projection area 15 is imaged from the left taken image 211 of the first camera 121 based on the calibration data. Further, the tip detection section 167 deforms the shape of the left extracted image 231 into a rectangular shape based on the calibration data to form the left rectangular image 235.

Specifically, the tip detection section 167 extracts the right extracted image 233 as an area where the projection area 15 is imaged from the right taken image 213 of the second camera 123 based on the calibration data. Further, the tip detection section 167 deforms the shape of the right extracted image 233 into a rectangular shape based on the calibration data to form the right rectangular image 237. The left rectangular image 235 and the right rectangular image 237 each become an image adjusted so that the disparity on the projection surface 10 becomes 0, namely an image calibrated with respect to the operation surface 13. Therefore, it is possible to determine the distance between the pointing element 80 and the operation surface 13 based on the disparity amount between the left rectangular image 235 and the right rectangular image 237.

The background processing section 163 executes a component removal step of removing a noise component from the left taken image 211 and the right taken image 213. The background processing section 163 corresponds to a component removal processing section in the present disclosure.

Specifically, the background processing section 163 removes the noise component from the left taken image 211 and the right taken image 213 based on the degree of coincidence in the luminance gradient between the left background image 215 and the left taken image 211, and the degree of coincidence in the luminance gradient between the right background image 217 and the right taken image 213, respectively.

Therefore, since the noise component is determined based on the degree of coincidence in the luminance gradient, it is possible to increase the determination accuracy of the noise component to effectively remove the noise included in the left taken image 211 and the right taken image 213.

The tip detection section 167 executes a difference image formation step of forming the difference image, an extraction step of performing the extraction as a candidate area, and a detection step of detecting the tip position of the pointing element.

Specifically, the tip detection section 167 forms the difference image 240 between the left rectangular image 235 and the right rectangular image 237 with the noise components removed. Further, the tip detection section 167 extracts the area in which the disparity amount between the left rectangular image 235 and the right rectangular image 237 is within a predetermined range out of the difference image 240 as the change area 250 in which the image of the pointing element 80 is included. Further, the tip detection section 167 detects the tip position 275 of the pointing element 80 from the change area 250 thus extracted based on the shape of the pointing element 80. Then, the determination section 169 executes the determination step of determining the pointing position of the pointing element 80 on the operation surface 13 and whether or not the pointing element 80 has had contact with the operation surface 13.

As described above, the present embodiment determines the operation position of the pointing element 80 and whether or not the pointing element 80 has had contact with the operation surface 13 based on the taken images by the stereo camera calibrated with respect to the operation surface 13. Therefore, compared to when imaging the operation surface 13 with a single camera to detect the pointing position of the pointing element 80, it is possible to improve the detection accuracy of the pointing position, in particular, the determination accuracy on whether or not the pointing element 80 has contact with the operation surface 13.

Further, by using the left taken image 211 and the right taken image 213 in which the image with the infrared light is taken for the detection of the pointing position of the pointing element 80, it is possible to suppress an influence of the image light, the illumination, the outside light, and so on displayed on the operation surface 13 on the detection of the pointing position.

Further, the tip detection section 167 calculates the variant value of the pixel values of the pixels constituting the difference image 240, and separates the difference image 240 into the background area and the foreground area as an area other than the background area based on the variant value thus calculated. The tip detection section 167 extracts the change area 250 based on the boundary between the background area and the foreground area thus separated and the area of the difference image in which the disparity amount is within a predetermined range.

Since the tip position 275 of the pointing element 80 is included in the boundary between the background area and the foreground area, it is possible to increase the detection accuracy of the tip position 275.

Further, the background processing section 163 removes the noise component from the left taken image 211 and the right taken image 213 based on the first luminance gradient map 221, the second luminance gradient map 223, and the third luminance gradient map 225.

The first luminance gradient map 221 represents the degree of coincidence in the luminance gradient between the left taken image 211 and the left background image 215. Further, the second luminance gradient map 223 represents the degree of coincidence in the luminance gradient between the left taken image 211 and the right taken image 213. Further, the third luminance gradient map 225 represents the degree of coincidence in the luminance gradient between the right taken image 213 and the right background image 217.

Therefore, since the noise component is determined based on the degree of coincidence in the luminance gradient between the background image and the taken image, it is possible to increase the accuracy in the determination of the noise component to effectively remove the noise included in the left taken image 211 and the right taken image 213.

The embodiment described above is a preferred embodiment of the present disclosure. It should be noted that the present disclosure is not limited to the embodiment, but a variety of modifications can be adopted within the scope or the spirit of the present disclosure.

For example, although in the embodiment described above, there is described the configuration of the position detection device 200 provided with the position detection section 150 and the control section 170, it is also possible to make the position detection section 150 alone function as the position detection device 200.

Further, although in the embodiment described above, there is described the configuration in which the projector 100 is provided with the imaging section 120, it is also possible to dispose the imaging section 120 as a separate body from the projector 100. For example, it is also possible to configure the imaging section 120 as an imaging device operating alone, and to couple the imaging device and the projector 100 wirelessly or with wire to each other. In this case, the imaging device and the projector 100 function as a device constituting the position detection system according to the present disclosure.

Further, each of the functional sections of the projector 100 shown in FIG. 3 is for showing the functional configuration, and the specific mounting forms are not particularly limited. In other words, it is not necessarily required to install the hardware corresponding individually to each of the functional sections, but it is obviously possible to adopt a configuration of realizing the functions of the plurality of functional sections by a single processor executing a program. Further, a part of the function realized by software in the embodiments described above can also be realized by hardware, and a part of the function realized by hardware can also be realized by software. Besides the above, the specific detailed configuration of each of other sections than the projector can arbitrarily be modified within the scope or the spirit of the present disclosure.

Further, the processing units of the flowcharts shown in FIG. 16, FIG. 19, and FIG. 26 are obtained by dividing the process of the projector 100 in accordance with major processing contents in order to make the process of the projector 100 easy to understand. The scope of the present disclosure is not limited by the way of the division or the names of the processing units shown in the flowcharts of FIG. 16, FIG. 19, and FIG. 26. Further, the process of the control section 170 can also be divided into a larger number of processing units, or can also be divided so that one processing unit includes a larger amount of process in accordance with the processing contents. Further, the processing sequence of the flowchart described above is not limited to the illustrated example.

Further, when realizing the position detection method using a computer provided to the projector 100, it is also possible to configure the program to be executed by the computer as an aspect of a recording medium, or an aspect of a transmission medium for transmitting the program. As the recording medium, there can be used a magnetic or optical recording medium, or a semiconductor memory device. Specifically, there can be cited a portable or rigid recording medium such as a flexible disk, an HDD (Hard Disk Drive), a CD-ROM, a DVD, a Blu-ray disc, a magnetooptic disc, a flash memory, or a card-type recording medium. Further, the recording medium described above can also be a RAM, or a nonvolatile storage device such as a ROM or the HDD as an internal storage device provided to the server device. Blu-ray is a registered trademark.

What is claimed is:

1. A position detection method of detecting a position in an operation surface pointed by a pointing element, the method comprising:
    irradiating with infrared light toward the operation surface;
    obtaining a first taken image by imaging the operation surface with a first camera configured to take an image with the infrared light;
    obtaining a second taken image by imaging the operation surface with a second camera different in imaging viewpoint from the first camera and configured to take an image with the infrared light;
    removing a noise component from the first taken image and the second taken image based on a degree of coincidence in luminance gradient between a first background image and the first taken image, and a degree of coincidence in luminance gradient between a second background image and the second taken image, the first background image being obtained by imaging the operation surface with the first camera when the pointing element does not point the operation surface, and the second background image being obtained by imaging the operation surface with the second camera when the pointing element does not point the operation surface;
    converting the first taken image from which the noise component removed into a first converted taken image calibrated with respect to the operation surface;
    converting the second taken image from which the noise component removed into a second converted taken image calibrated with respect to the operation surface;
    forming a difference image between the first converted taken image and the second converted taken image;
    extracting an area in which a disparity amount between the first converted taken image and the second converted taken image is within a predetermined range out of the difference image as a candidate area in which an image of the pointing element is included, wherein the extracting includes
        calculating a variant value of pixel values of pixels constituting the difference image,
        separating the difference image into a background area and a foreground area which is an area other than the background area based on the variant value, and
        extracting the candidate area based on a boundary between the background area and the foreground area and the area in which the disparity amount is within the predetermined range;
    detecting a tip position of the pointing element from the candidate area based on a shape of the pointing element; and
    determining a pointing position of the pointing element in the operation surface and whether or not the pointing element had contact with the operation surface based on a result of the detecting.

2. A position detection device comprising:
a first processor configured to irradiate with infrared light toward an operation surface on which an operation with a pointing element is performed; and
a second processor configured to
    obtain a first taken image obtained by imaging the operation surface with a first camera configured to take an image with the infrared light,
    obtain second taken image obtained by imaging the operation surface with a second camera different in imaging viewpoint from the first camera and configured to take an image with the infrared light,
    remove a noise component from the first taken image and the second taken image based on a degree of coincidence in luminance gradient between a first background image and the first taken image, and a degree of coincidence in luminance gradient between a second background image and the second taken image, the first background image being obtained by imaging the operation surface with the first camera when the pointing element does not point the operation surface, and the second background image being obtained by imaging the operation surface with the second camera when the pointing element does not point the operation surface,
    convert the first taken image from which the noise component removed into a first converted taken image calibrated with respect to the operation surface,
    convert the second taken image from which the noise component removed into a second converted taken image calibrated with respect to the operation surface,
    form a difference image between the first converted taken image and the second converted taken image,
    extract an area in which a disparity amount between the first converted taken image and the second converted taken image is within a predetermined range out of the difference image as a candidate area in which an image of the pointing element is included;
    detect a tip position of the pointing element from the candidate area based on a shape of the pointing element, and
    determine a pointing position of the pointing element in the operation surface and whether or not the pointing element had contact with the operation surface based on a result of the detecting, wherein
        the determining includes inputting a first area image clipped from the first converted taken image based on the tip position and a second area image clipped from the second converted taken image based on the tip to a learned neural network to determine the pointing position and whether or not the pointing element had contact with the operation surface.

3. A display device comprising:
a light source configured to irradiate with infrared light toward an operation surface on which an operation with a pointing element is performed;
a first camera configured to take an image with infrared light;

a second camera different in imaging viewpoint from the first camera, and configured to take an image with the infrared light;

a processor configured to obtain a first taken image by imaging the operation surface with the first camera, obtain a second taken image by imaging the operation surface with the second camera, remove a noise component from the first taken image and the second taken image based on a degree of coincidence in luminance gradient between a first background image and the first taken image, and a degree of coincidence in luminance gradient between a second background image and the second taken image, the first background image being obtained by imaging the operation surface with the first camera when the pointing element does not point the operation surface, and the second background image being obtained by imaging the operation surface with the second camera when the pointing element does not point the operation surface, wherein the removing includes removing the noise component from the first taken image and the second taken image based on the degree of coincidence in luminance gradient between the first background image and the first taken image, the degree of coincidence in luminance gradient between the second background image and the second taken image, and a degree of coincidence in luminance gradient between the first taken image and the second taken image, convert the first taken image from which the noise component removed into a first converted taken image calibrated with respect to the operation surface;

convert the second taken image from which the noise component removed into a second converted taken image calibrated with respect to the operation surface, form a difference image between the first converted taken image and the second converted taken image;

extract an area in which a disparity amount between the first converted taken image and the second converted taken image is within a predetermined range out of the difference image as a candidate area in which an image of the pointing element is included, detect a tip position of the pointing element from the candidate area based on a shape of the pointing element, determine a pointing position of the pointing element in the operation surface and whether or not the pointing element had contact with the operation surface based on a result of the detecting; and a light modulation device configured to display an image on the operation surface based on the pointing position.

* * * * *